(12) United States Patent
Ohara et al.

(10) Patent No.: US 10,674,022 B2
(45) Date of Patent: Jun. 2, 2020

(54) SERVER, SERVER SYSTEM, NON-TRANSITORY COMPUTER-READABLE RECORDING MEDIUM STORING COMPUTER-READABLE INSTRUCTIONS FOR SERVER, AND METHOD PERFORMED BY SERVER

(71) Applicant: BROTHER KOGYO KABUSHIKI KAISHA, Nagoya-shi, Aichi (JP)

(72) Inventors: Kiyotaka Ohara, Nagoya (JP); Tatsuhiro Ikedo, Ena (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/406,097

(22) Filed: May 8, 2019

(65) Prior Publication Data
US 2019/0349486 A1 Nov. 14, 2019

(30) Foreign Application Priority Data
May 10, 2018 (JP) ................ 2018-091456

(51) Int. Cl.
H04N 1/00 (2006.01)
H04L 29/08 (2006.01)
H04N 1/44 (2006.01)
G06F 3/12 (2006.01)

(52) U.S. Cl.
CPC ......... *H04N 1/00244* (2013.01); *G06F 3/126* (2013.01); *G06F 3/1206* (2013.01); *G06F 3/1292* (2013.01); *H04L 67/02* (2013.01); *H04L 67/1097* (2013.01); *H04L 67/146* (2013.01); *H04N 1/00209* (2013.01); *H04N 1/00464* (2013.01); *H04N 1/4413* (2013.01)

(58) Field of Classification Search
CPC ........... H04N 1/00244; H04N 1/00209; H04N 1/00464; H04N 1/4413; H04L 67/02; H04L 67/1097; H04L 67/146; G06F 3/1206; G06F 3/126; G06F 3/1292
USPC ...................................... 358/1.14
See application file for complete search history.

(56) References Cited

U.S. PATENT DOCUMENTS

| 2012/0013927 | A1* | 1/2012 | Asai | G06F 3/1204 358/1.13 |
| 2015/0067819 | A1* | 3/2015 | Shribman | H04L 63/029 726/12 |
| 2015/0378654 | A1* | 12/2015 | Asai | G06F 3/1224 358/1.15 |

FOREIGN PATENT DOCUMENTS

JP 2012-068828 A 4/2012

* cited by examiner

*Primary Examiner* — Allen H Nguyen
(74) *Attorney, Agent, or Firm* — Scully, Scott, Murphy & Presser, PC

(57) ABSTRACT

A server may receive a specific signal including specific information from a terminal device via the Internet, the specific information being obtained by using relative information related to a peripheral device that is used by a user of the terminal device, the peripheral device being different from the terminal device, and the relative information including at least one of identification information for identifying the peripheral device and model information indicating a model of the peripheral device; acquire output data corresponding to the relative information by using the specific information included in the specific signal received from the terminal device, and send the acquired output data to an external device via the Internet.

19 Claims, 21 Drawing Sheets

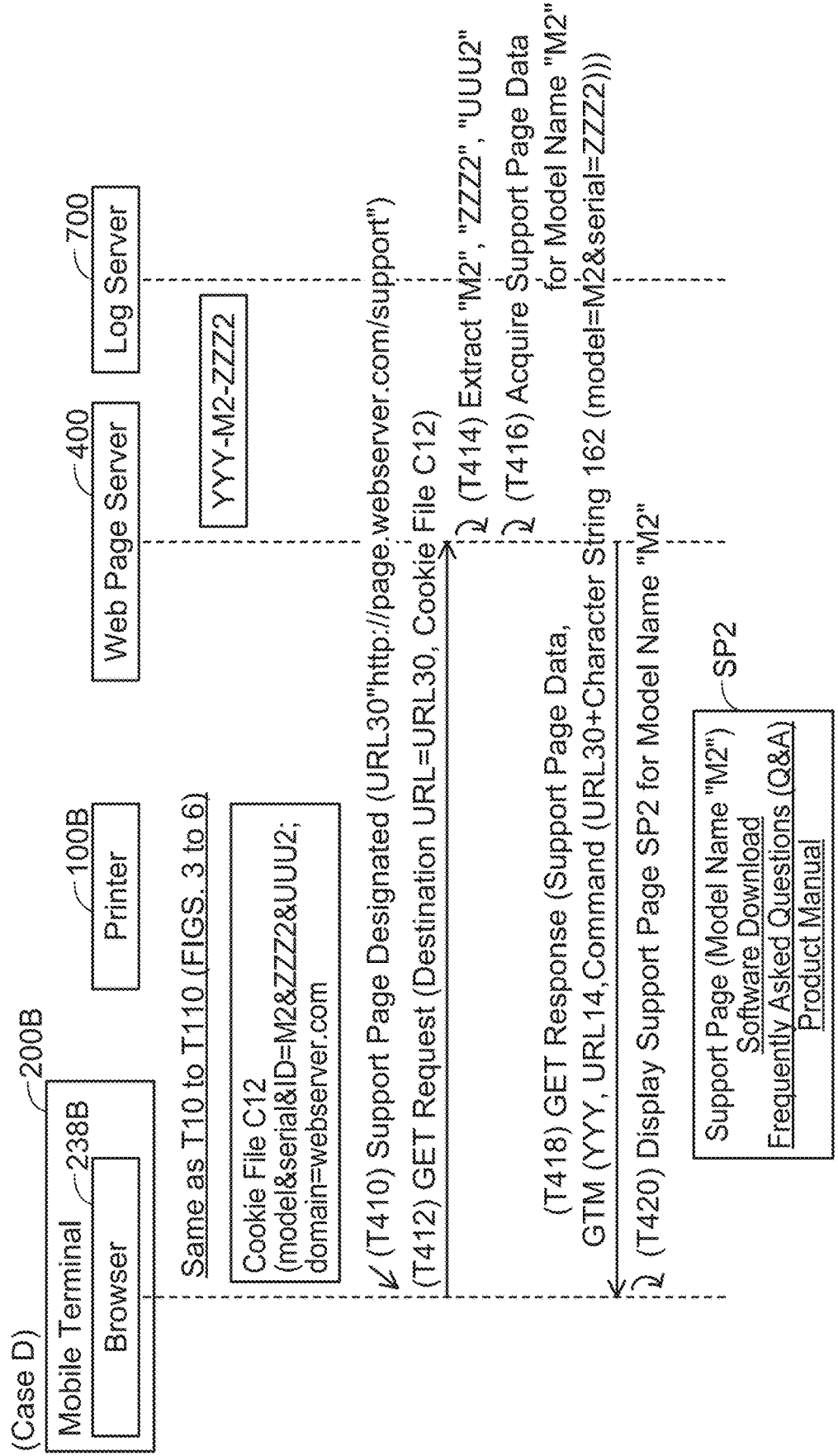

(Second to Fourth Embodiments)

FIG. 19

(Variant)

```
                                              D31
                                              /
┌─────────────────────────────────────────────────┐
│              Support Top Page                    │
├──────────────────────────────────┬───────────────┤
│                                  │ Is this model │
│      Please select model name    │ being used?   │
│                                  │               │
│     M1,   M2,   M3,   M4,   M5,  │               │
│    MM1,  MM2,  MM3,  MM4,  MM5,  │      M1       │
│   MMM1, MMM2, MMM3, MMM4, MMM5   │               │
└──────────────────────────────────┴───────────────┘
```

SERVER, SERVER SYSTEM, NON-TRANSITORY COMPUTER-READABLE RECORDING MEDIUM STORING COMPUTER-READABLE INSTRUCTIONS FOR SERVER, AND METHOD PERFORMED BY SERVER

CROSS-REFERENCE TO RELATED APPLICATION

This application claims priority to Japanese Patent Application No. 2018-091456, filed on May 10, 2018, the entire contents of which are hereby incorporated by reference into the present application.

TECHNICAL FIELD

The disclosure herein discloses a server configured to send output data to an external device.

BACKGROUND ART

An advertisement distribution system provided with a client terminal, a web server, an advertisement distribution management server, and an advertisement distribution server is known. When accepting an access operation to a web page by a user, the client terminal receives HTML data from the web server. The client terminal accesses the advertisement distribution management server according to a script embedded in the HTML data and receives a cookie ID from the advertisement distribution management server. Then, the client terminal sends the cookie ID to the advertisement distribution server. The advertisement distribution management server uses the cookie ID to specify an access history of the client terminal and sends to the client terminal a web page corresponding to the access history.

SUMMARY

The disclosure herein provides a server configured to send to an external device suitable output data that corresponds to a peripheral device used by a user of a terminal device.

A server disclosed herein may comprise a processor; and a first memory storing computer-readable instructions therein, the computer-readable instructions, when executed by the processor, causing the server to: receive a specific signal including specific information from a terminal device via the Internet, the specific information being obtained by using relative information related to a peripheral device that is used by a user of the terminal device, the peripheral device being different from the terminal device, and the relative information including at least one of identification information for identifying the peripheral device and model information indicating a model of the peripheral device; acquire output data corresponding to the relative information by using the specific information included in the specific signal received from the terminal device; and send the acquired output data to an external device via the Internet, wherein a first specific signal including first specific information is received from a first terminal device via the Internet, the first specific information being obtained by using first relative information related to a first peripheral device that is used by a first user of the first terminal device, the first peripheral device being different from the first terminal device, and a second specific signal including second specific information is received from a second terminal device via the Internet, the second specific information being obtained by using second relative information related to a second peripheral device that is used by a second user of the second terminal device, the second peripheral device being different from the second terminal device, the second peripheral device is different from the first peripheral device, the second relative information is different from the first relative information, the second specific information is different from the first specific information, first output data corresponding to the first relative information is acquired by using the first specific information, in response to receiving the first specific signal including the first specific information from the first terminal device, second output data corresponding to the second relative information is acquired by using the second specific information, in response to receiving the second specific signal including the second specific information from the second terminal device, the second output data being different from the first output data, the acquired first output data is sent to a first external device in a case where the first output data is acquired, and the acquired second output data is sent to a second external device in a case where the second output data is acquired.

A control method and a computer program for realizing the above server, and a computer-readable recording medium storing the computer program are also novel and useful. Further, a system comprising the above server is also novel and useful.

BRIEF DESCRIPTION OF THE DRAWINGS

FIG. 10 shows a sequence diagram of Case D in which a support page is designated.

FIG. 19 shows an example of a screen displayed on a mobile terminal according to a variant.

EMBODIMENTS

Figure 1:
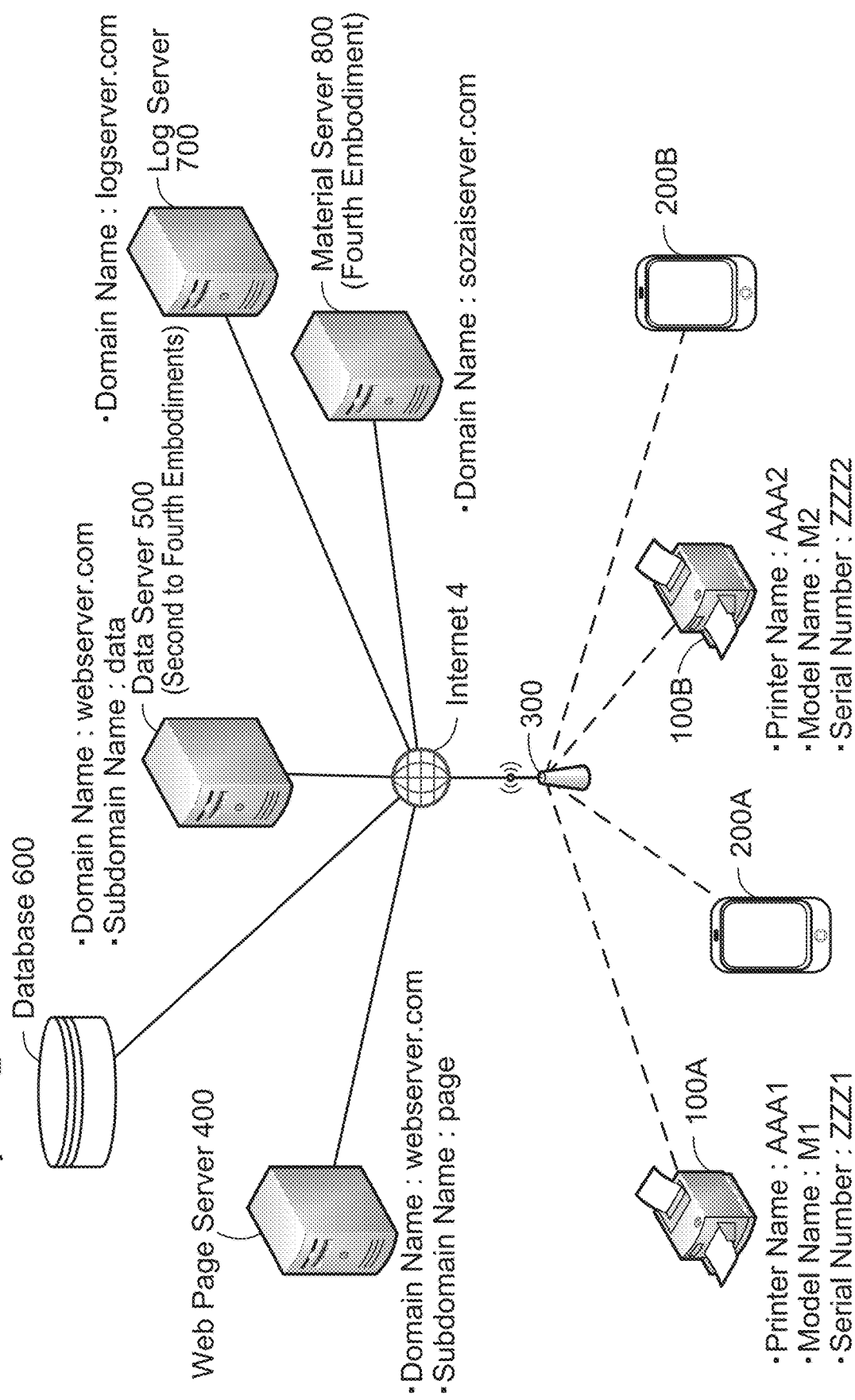
FIG. 1 shows a configuration of a communication system.

First Embodiment (Configuration of Communication System 2; FIGS. 1 and 2)

As shown in FIG. 1, a communication system 2 is provided with a plurality of printers 100A, 100B, a plurality of mobile terminals 200A, 200B, a web page server 400, a database 600, and a log server 700. The printers 100A, 100B and the mobile terminals 200A, 200B are connected to a same Access Point (AP) 300 (that is, they belong to a same wireless Local Area Network (LAN)) and are capable of communicating with each other via the AP 300. In a variant, a wired LAN may be used instead of the wireless LAN. Further, the printers 100A, 100B and the mobile terminals 200A, 200B are connected to the Internet 4 via the AP 300. The servers 400, 700 and the database 600, which are separately configured from one another, are provided on the Internet 4.

(Configurations of Printers 100A, 100B)

Each of the printers 100A, 100B is a peripheral device configured to execute a print function (that is, peripheral devices for the mobile terminals 200A, 200B, respectively). The printer 100A has a printer name "AAA1", a model name "M1", and a serial number "ZZZ1". The printer 100B has a printer name "AAA2", a model name "M2", and a serial number "ZZZ2". The printer names are given to the printers 100A, 100B by an administrator of the printers. The model names indicate models of the printers. The serial numbers are unique numbers given to the printers 100A, 100B by a vendor of the printers. The printers 100A, 100B are manufactured by the same vendor (hereinbelow termed "printer vendor"). Further, hereinbelow, the printers 100A, 100B may collectively be called "printers 100".

(Configurations of Mobile Terminals 200A, 200B)

Figure 2A:
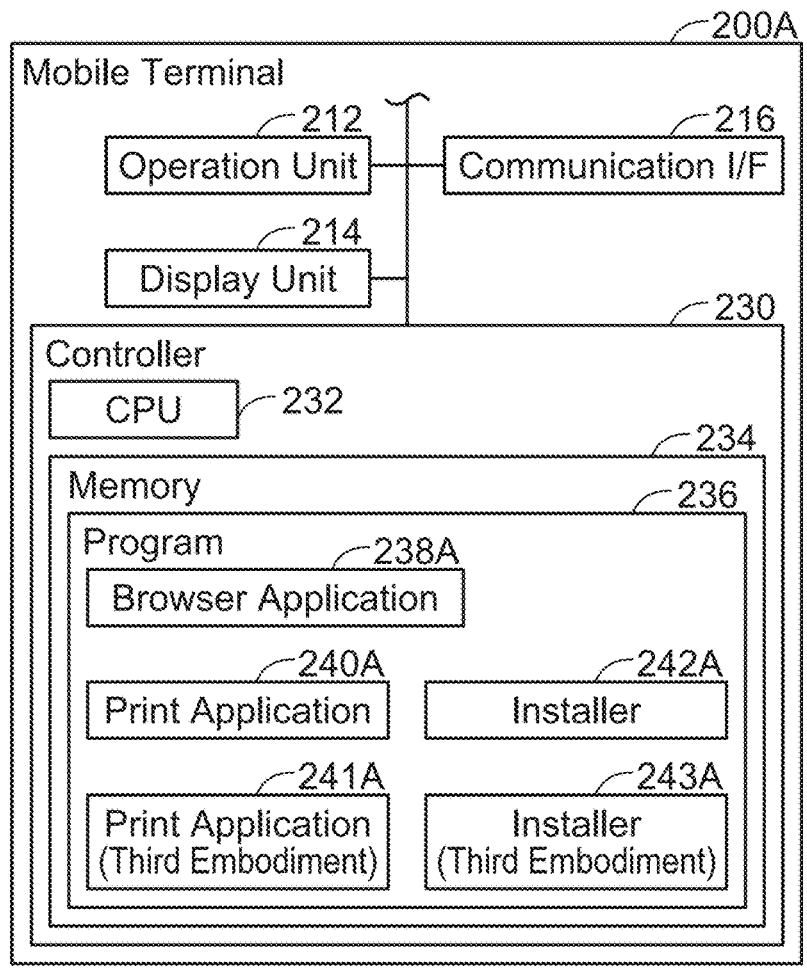
FIG. 2A shows a configurational diagram of a mobile terminal.

Each of the mobile terminals 200A, 200B is a portable terminal device such as a cellphone, a smartphone, a PDA, a notebook PC, a tablet PC, a portable music player, and a portable movie player. In a variant, a stationary terminal device may be used instead of the mobile terminal 200A. As shown in FIG. 2A, the mobile terminal 200A includes an operation unit 212, a display unit 214, a communication interface (hereinbelow, an interface will be denoted "I/F") 216, and a controller 230.

The operation unit 212 includes a plurality of keys. A user can input various instructions to the mobile terminal 200A by operating the operation unit 212. The display unit 214 is a display configured to display various types of information and also functions as a so-called touch panel (that is, an operation unit). Hereinbelow, the operation unit 212 and the display unit 214 may collectively be termed "terminal operation unit". The communication I/F 216 is an I/F for establishing a wireless connection with the AP 300.

The controller 230 includes a CPU 232 and a memory 234. The CPU 232 is configured to execute various processes according to a program 236 stored in the memory 234. The memory 234 is constituted of a ROM, a RAM, and the like. The program 236 includes a browser application 238A (hereinbelow termed "browser 238A"), a print application 240A (hereinbelow termed "print app 240A"), and an installer 242A. The browser 238A is general-purposed web page browsing software, such as Internet Explorer (IE (registered trademark)), Safari (registered trademark), and Google Chrome (registered trademark). The print app 240A is an application for supplying print data representing a print target image to a printer (e.g., 100A). The installer 242A is a program for installing the print app 240A to the mobile terminal 200A. The installer 242A may be installed in the mobile terminal 200A from a computer-readable recording medium shipped with the printer, or may be installed in the mobile terminal 200A from a server on the Internet 4, for example.

Figure 2B:
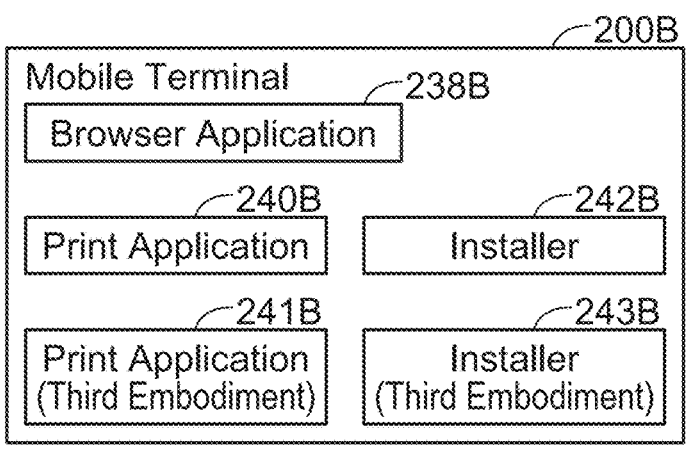
FIG. 2B shows a configurational diagram of a mobile terminal.

The mobile terminal 200B has a similar configuration as that of the mobile terminal 200A. As shown in FIG. 2B, the mobile terminal 200B includes an installer 242B, a browser application 238B (hereinbelow termed "browser 238B"), and a print application 240B (hereinbelow termed "print app 240B"). Hereinbelow, the mobile terminals 200A, 200B may collectively be termed "mobile terminals 200".

(Configuration of Web Page Server 400)

The web page server 400 is a server that is provided on the Internet 4 by the printer vendor and is configured to supply web page data representing web pages. A domain name and a subdomain name of the web page server 400 are respectively "webserver.com" and "page".

Figure 2C:
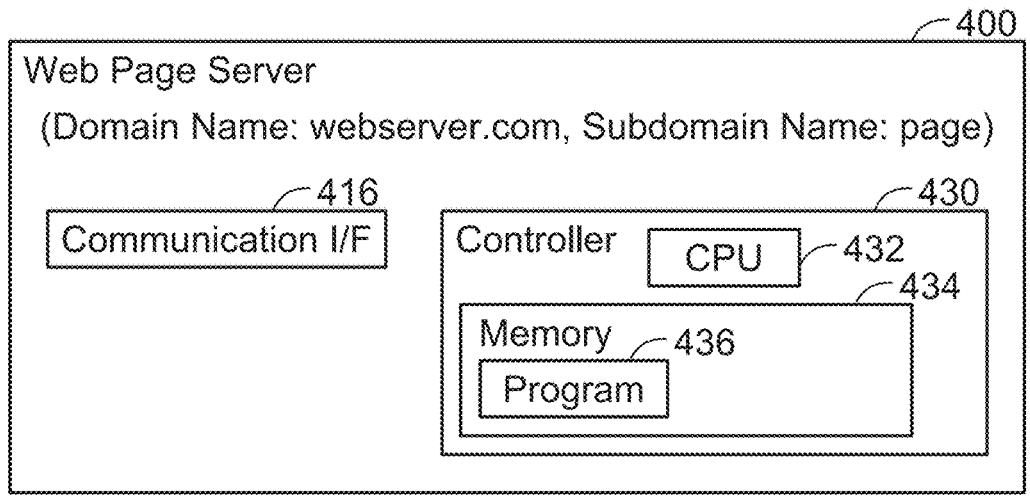
FIG. 2C shows a configurational diagram of a web page server.

As shown in FIG. 2C, the web page server 400 includes a communication I/F 416 and a controller 430. The communication I/F 416 is connected to the Internet 4. The controller 430 includes a CPU 432 and a memory 434. The CPU 432 is configured to execute various processes according to a program 436 stored in the memory 434. The memory 434 is constituted of a ROM, a RAM, and the like. Further, although not shown, the memory 434 stores web page data representing various web pages (such as data in a HyperText Markup Language (HTML) format, image data, etc.). The web page server 400 is configured to supply the web page data in the memory 434 to the mobile terminals 200 according to requests from the mobile terminals 200.

(Configuration of Database 600)

Figure 2D:
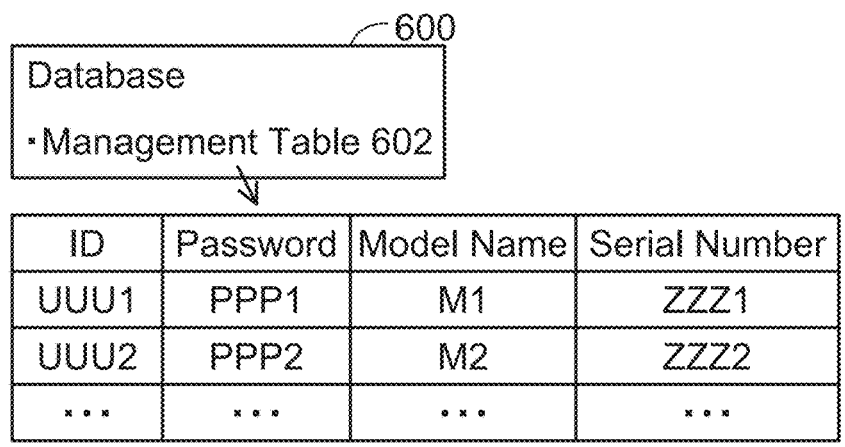
FIG. 2D shows a configurational diagram of a database.

The database 600 is provided on the Internet 4 by the printer vendor and stores a management table 602 as shown in FIG. 2D. In the management table 602, an ID, a password, a model name, and a serial number are associated with each other. The server provided on the Internet 4 by the printer vendor (that is, the web page server 400) can access the database 600. The ID is a character string allocated to each user, and the password is a character string set by the user. Hereinbelow, the ID, the password, the model name, and the serial number may collectively be termed "user information".

(Configuration of Log Server 700)

The log server 700 is a server that is provided on the Internet 4 by a business entity different from the printer vendor and is configured to store an access history to web pages. In the present embodiment, the log server 700 is provided by Google (registered trademark). However, in a variant, the log server 700 may be provided by another business entity (such as the printer vendor). A domain name of the log server 700 is "logserver.com".

Figure 2E:
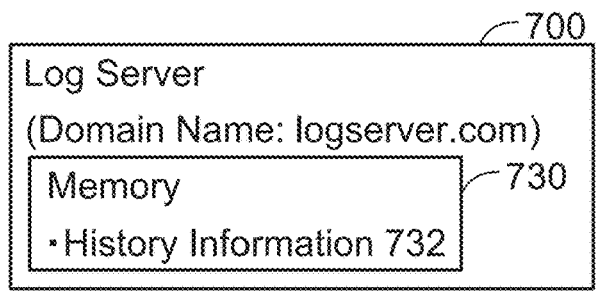
FIG. 2E shows a configurational diagram of a log server.

As shown in FIG. 2E, the log server 700 includes a memory 730. The memory 730 is constituted of a ROM, a RAM, and the like. The memory 730 is configured to store history information 732 indicating the access history to web pages.

(Case A; FIGS. 3 to 6)

Next, Case A will be described with reference to FIGS. 3 to 6. In Case A, the print app 240A is installed in the mobile terminal 200A and the model name "M1" and the serial number "ZZZ1" of the printer 100A are registered in the management table 602 of the database 600. In an initial state of Case A, an ID "UUU1" and a password "PPP1" corresponding to a user of the mobile terminal 200A and an ID "UUU2" and a password "PPP2" corresponding to a user of the mobile terminal 200B are already registered in the management table 602 of the database 600. Hereinbelow, to facilitate understanding, processes which the CPU 232 of the mobile terminal 200A executes will be described with the browser 238A or the installer 242A of the mobile terminal 200A as a subject of action instead of describing them with the CPU as the subject of action. Further, processes which the CPU 432 of the web page server 400 executes will be described with the web page server 400 as a subject of action instead of describing them with the CPU as the subject of action.

In T10, an operation to activate the installer 242A is performed by the user on the terminal operation unit. In this case, in T12, the installer 242A broadcasts a search signal. The search signal is a signal for requesting each of one or more peripheral devices connected to the AP 300 (such as the printers 100A, 100B) to send a response signal including device information of the peripheral device (that is, a printer name, a model name, and a serial number).

When the printer 100A receives the search signal in T12, it sends a response signal including the device information of the printer 100A (that is, the printer name "AAA1", the model name "M1", and the serial number "ZZZ1") to the mobile terminal 200A in T14. Although not shown, the printer 100B also executes a process similar to T14.

When the installer 242A receives response signals from the one or more peripheral devices including the printer 100A in T14, it causes the display unit 214 to display a selection screen S1 in T16. The selection screen S1 includes the printer name and the model name of each of the one or more peripheral devices.

In T18, an operation to select the printer name "AAA1" and the model name "M1" of the printer 100A in the selection screen S1 is performed on the terminal operation unit. In this case, in T20, the installer 242A installs the print app 240A. When installation of the print app 240A is completed, the installer 242A causes the display unit 214 to display an installation completion screen S2 in T22. The installation completion screen S2 includes a message indicating that the installation of the print app 240A is completed, a message inquiring whether or not to permit log collection, a check box, and an OK button.

The installer 242A determines that the log collection is permitted in T24 when it accepts a check in the check box and an operation of the OK button, and then it generates a Uniform Resource Locator (URL) 12 and supplies (that is, delivers) the URL 12 to the browser 238A in T26. In general, a URL includes a scheme component, an authority component, a path component, and a query component. For example, in a URL "http://page.webserver.com/aaa/bbb?xxx", "http" corresponds to the scheme component, "page.webserver.com" following characters ":" and "//" corresponds to the authority component, "aaa/bbb" corresponds to the path component, and "xxx" following a character "?" corresponds to the query component. A URL may not include the query component. The installer 242A firstly specifies a preset URL 12a (that is, "http://page.webserver.com/fin"). The URL 12a includes the subdomain name "page" and the domain name "webserver.com" of the web page server 400. Then, the installer 242A adds a query character string 12b to the URL 12a to generate the URL 12. The query character string 12b includes the model name "M1" and the serial number "ZZZ1" of the printer 100A selected in T18 (that is, "model=M1&serial=ZZZ1"). Then, in T26, the installer 242A supplies the generated URL 12 to the browser 238A.

When acquiring the URL 12 from the installer 242A in T26, the browser 238A sends a GET request including the URL 12 as a destination URL to the web page server 400 in T30.

When receiving the GET request from the mobile terminal 200A in T30, the web page server 400 extracts in T32 a character string described preceding the character "?" in the URL 12 (that is, the scheme component, the authority component, and the path component) included in the GET request as the URL 12a, and extracts a character string described following the character "?" (that is, the query component) as the query character string 12b. The web page server 400 further extracts the model name "M1" and the serial number "ZZZ1" of the printer 100A from the query character string 12b. As above, the web page server 400 extracts the model name "M1" and the serial number "ZZZ1" from the destination URL 12, thus the model name "M1" and the like do not have to be extracted from another region in the GET request where information different from the destination URL 12 is to be described. Due to this, the model name "M1" and the like can easily be extracted. However, in a variant, the model name "M1" and the like may be described in the aforementioned other region in the GET request, and the web page server 400 may extract the model name "M1" and the like from the other region.

In T34, the web page server 400 uses the extracted model name "M1" and serial number "ZZZ1" to generate a cookie file C1. The cookie file C1 includes a cookie name area where a cookie name is described and a domain area where domain information is described. The web page server 400 describes "M1" and "ZZZ1" (that is, "model&serial=M1&ZZZ1") in the cookie name area and describes the domain name of the web page server 400 in the domain area (that is, "domain=webserver.com"). Since the cookie file C1 includes the information of the printer 100A (that is, the model name "M1" and the serial number "ZZZ1"), the cookie file C1 and the information are associated with each other.

In T36, the web page server 400 stores a client ID "YYY", the model name "M1", and the serial number "ZZZ1" in association with each other. The client ID is a unique ID allocated to each vendor (that is, each client) that manages a server on the Internet 4. The printer vendor, which is one of the clients, is allocated with the client ID "YYY".

Figure 3:
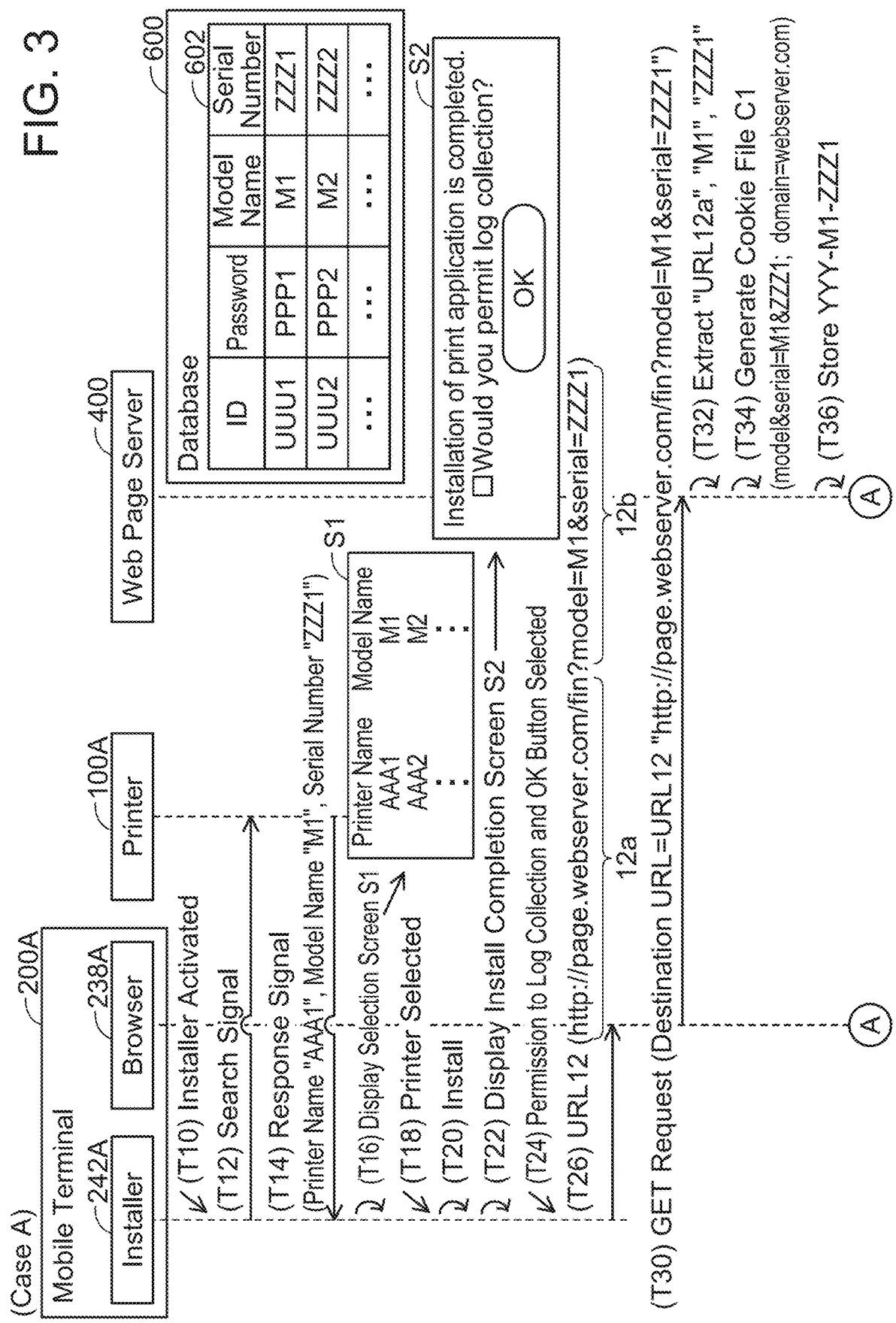
FIG. 3 shows a sequence diagram of Case A in which an installer is activated.
Figure 4:
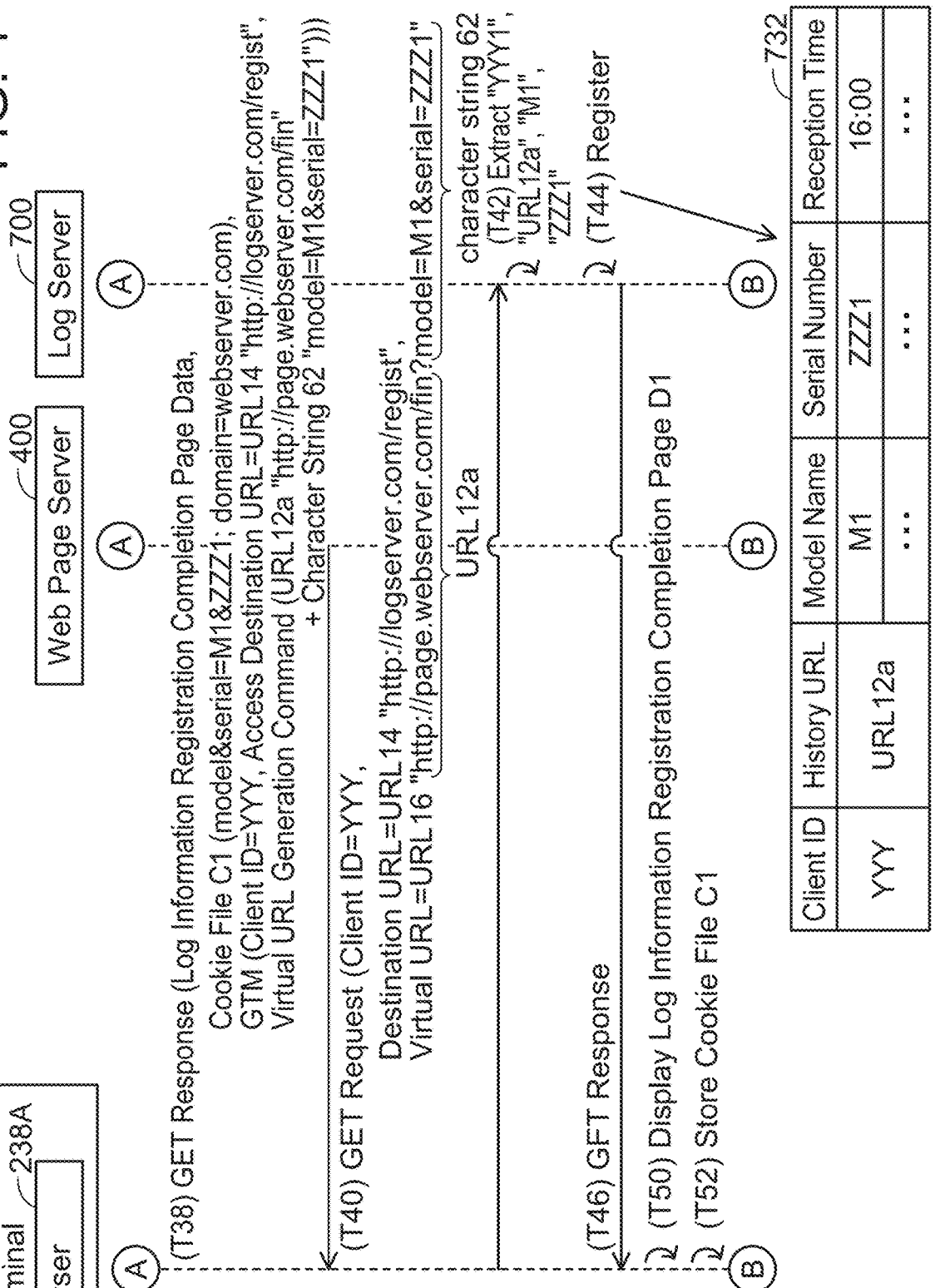
FIG. 4 shows a sequence diagram continued from FIG. 3.

In T38 of FIG. 4, the web page server 400 sends a GET response to the mobile terminal 200A. This Get response includes log information registration completion page data corresponding to the URL 12a, the cookie file C1 generated in T34 of FIG. 3, and a Google (registered trademark) Tag Manager (GTM). The GTM is instruction information for causing the mobile terminal 200A to access the log server 700. The GTM includes the client ID "YYY", a URL 14 "http://logserver.com/regist" which is an access destination URL, and a virtual URL generation command. The access destination URL 14 includes the domain name of the log server 700 (that is, "logserver.com"). As such, the mobile terminal 200A can access the log server 700 by using the access destination URL 14. The virtual URL generation command is described in accordance with JavaScript (registered trademark) which the browser 238A of the mobile terminal 200A can interpret, and is a command for causing the mobile terminal 200A to generate a virtual URL. The virtual URL generation command includes the URL 12a extracted in T32 (that is, "http://page.webserver.com/fin") and a character string 62 including the model name "M1" and the serial number "ZZZ1" extracted in T32 (that is, "model =M1&serial=ZZZ1").

When receiving the GET response from the web page server 400 in T38, the browser 238A executes in T40 the virtual URL generation command included in the response. Specifically, the browser 238A generates a virtual URL 16 (that is, "http://page.webserver.com/fin?model= M1& serial=ZZZ1") that includes the URL 12a in the command and a query character string which is the character string 62 in the command. The browser 238A further extracts the client ID "YYY" and the access destination URL 14 from the GTM included in the response. Then, the browser 238A sends a GET request to the log server 700. The GET request includes the extracted URL 14 as a destination URL and further includes the extracted client ID "YYY" and the generated virtual URL 16. The virtual URL 16 is not a destination URL and serves a role for notifying a character string constituting the virtual URL 16 to the log server 700.

When receiving the GET request from the mobile terminal 200A in T40, the log server 700 extracts in T42 the respective pieces of information from the GET request. Specifically, the log server 700 extracts the client ID "YYY", extracts a character string described preceding the character "?" in the virtual URL 16 as the URL 12a, and extracts a character string described following the character "?" in the virtual URL 16 as the query character string 62. The log server 700 further extracts the model name "M1" and the serial number "ZZZ1" of the printer 100A from the query character string 62.

In T44, the log server 700 stores history information 732 in the memory 730. In the history information 732, the respective extracted pieces of information (that is, the client ID "YYY", the URL 12a, the model name "M1", and the serial number "ZZZ1") is associated with a reception time (e.g., "16:00, Apr. 30, 2018"). The reception time is a time when the GET request was received from the mobile terminal 200A. Due to this, the URL 12a which was accessed by the mobile terminal 200A according to an instruction by the user of the mobile terminal 200A is associated with the information of the printer 100A (that is, the model name "M1" and the serial number "ZZZ1").

In T46, the log server 700 sends a GET response for the GET request in T40 to the mobile terminal 200A. This response does not include web page data. That is, the GET request in T40 is not a signal for requesting web page data, but is a signal for storing the respective pieces of information included in the GET request in the log server 700.

Figure 11A:
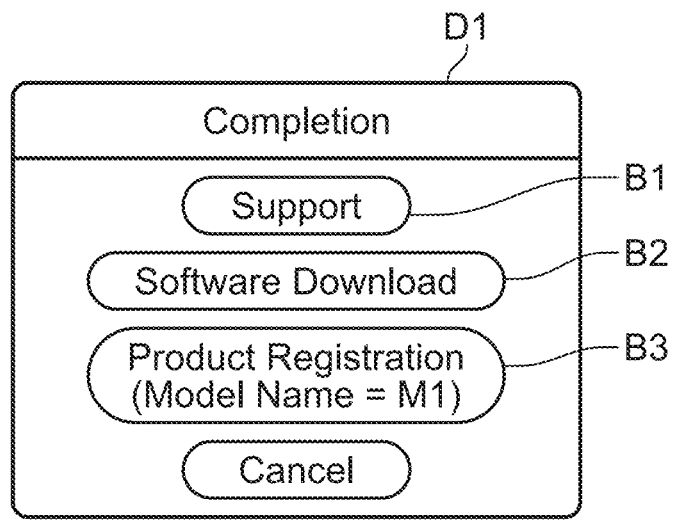
FIG. 11A shows a screen displayed on the mobile terminal.

When receiving the GET response from the log server 700 in T46, the browser 238A causes the display unit 214 in T50 to display a log information registration completion page D1 represented by the log information registration completion page data included in the GET response of T38. As shown in FIG. 11A, the page D1 includes a button B1 for displaying a support page, a button B2 for downloading software provided by the printer vendor, a button B3 for executing a product registration for the printer 100A, and a cancel button. The product registration means to register the model name "M1" and the serial number "ZZZ1" of the printer 100A in the database 600. The button B3 includes the model name "M1" of the printer 100A.

In T52, the browser 238A stores the cookie file C1 included in the GET response of T38 in the memory 234. By doing so, in a case where an instruction for designating a URL including the character string "webserver.com" described in the domain area of the cookie file C1 is given by the user of the mobile terminal 200A, the mobile terminal 200A can send a GET request including that URL and the cookie file C1 to the web page server 400.

Figure 5:
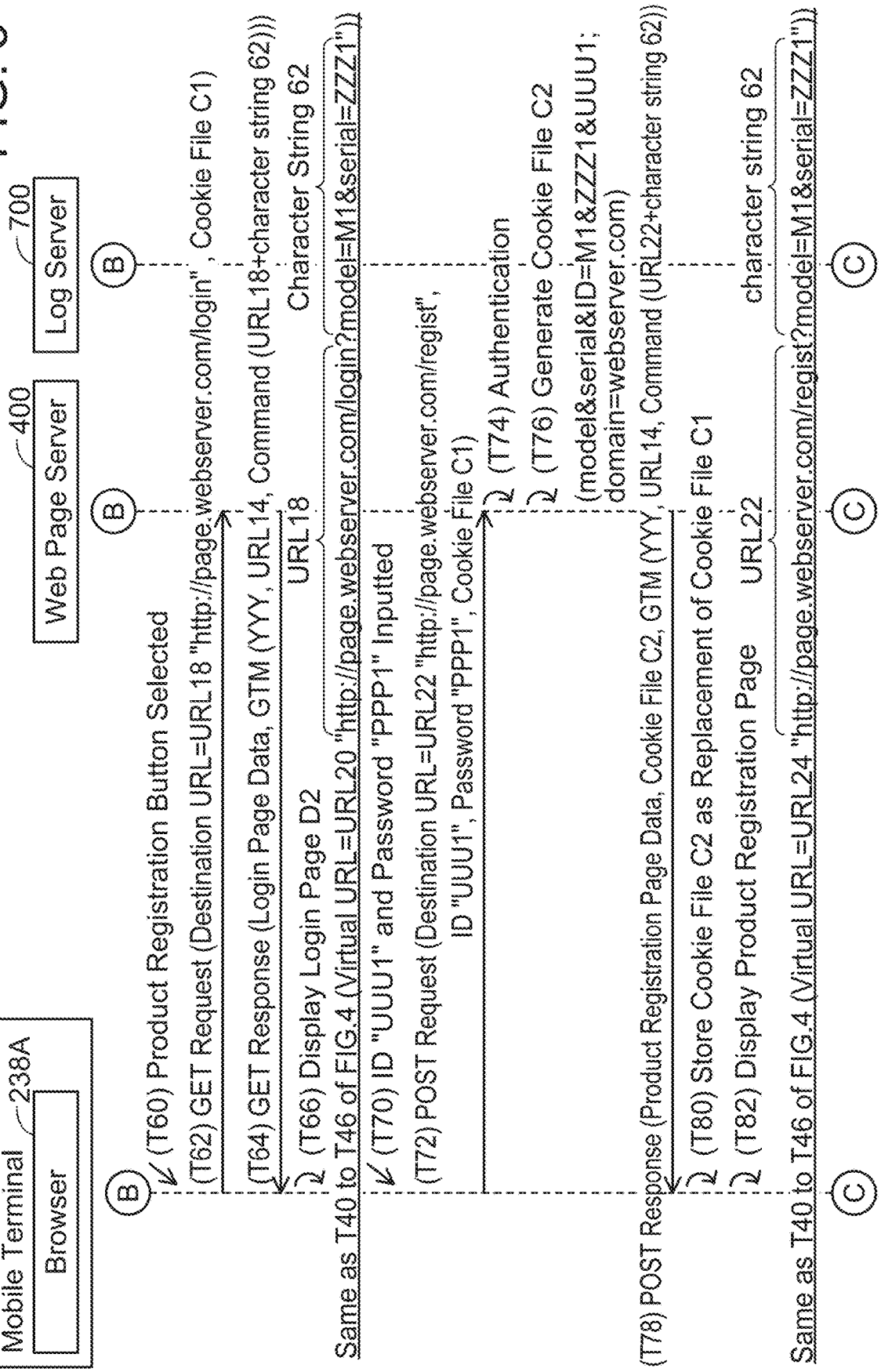
FIG. 5 shows a sequence diagram continued from FIG. 4.

When selection of the button B3 in the page D1 is accepted in T60 of FIG. 5, the browser 238A specifies a URL 18 "http://page.webserver.com/login" associated with the button B3. In this case, the browser 238A refers to the stored cookie file C1 (see T52 of FIG. 4) and determines that the specified URL 18 includes the domain name "webserver.com" described in the domain area of the cookie file C1. Then, in T62, the browser 238A sends to the web page server 400 a GET request that includes the URL 18 as a destination URL and further includes the cookie file C1.

When receiving the GET request from the mobile terminal 200A in T62, the web page server 400 sends to the mobile terminal 200A in T64 a GET response including login page data corresponding to the URL 18 and a GTM. This GTM is similar to the GTM in T38 of FIG. 4 except that its virtual URL generation command includes the URL 18.

Figure 11B:
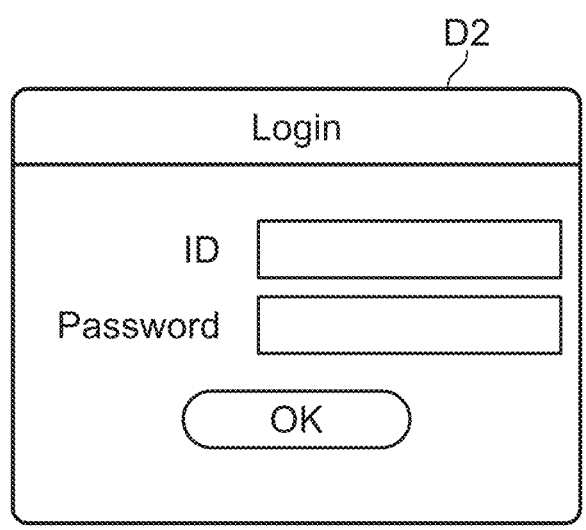
FIG. 11B shows a screen displayed on the mobile terminal.

When receiving the GET response from the web page server 400 in T64, the browser 238A causes the display unit 214 in T66 to display a login page D2 represented by the login page data. As shown in FIG. 11B, the page D2 includes an ID input box to which an ID is to be inputted, a password input box to which a password is to be inputted, and an OK button. Further, the browser 238A generates a virtual URL 20 "http://page.webserver.com/login?model=M1& serial= ZZZ1" including the URL 18 and the character string 62 in accordance with the GTM included in the response of T64. Then, processes similar to T40 to T46 of FIG. 4 are executed between the mobile terminal 200A and the log server 700. As a result, the URL 18 is stored in the log server 700.

When input of the ID "UUU1" and the password "PPP1" is accepted from the user of the mobile terminal 200A and an operation on the OK button is further accepted in T70, the browser 238A specifies a URL 22 "http://page.webserver.com/regist" associated with the OK button. Then, the browser 238A determines that the specified URL 22 includes the domain name "webserver.com" in the cookie file C1 and sends to the web page server 400 in T72 a POST request that includes the URL 22 as a destination URL and further includes the ID "UUU1", the password "PPP1", and the cookie file C1.

When receiving the POST request from the mobile terminal 200A in T72, the web page server 400 executes authentication of the user. Specifically, the web page server 400 accesses the database 600 and determines whether or not user information including the ID "UUU1" and the password "PPP1" is already registered in the management table 602. In the present case, the web page server 400 determines that the user information is already registered in the management table 602 (see the management table 602 of FIG. 3), by which the user authentication succeeds in T74.

In T76, the web page server 400 generates a cookie file C2 by using the cookie file C1 and the ID "UUU1". The web page server 400 adds the ID "UUU1" (that is, "model&serial&ID=M1&ZZZ1&UUU1") to the cookie name area of the cookie file C1. Then, in T78, the web page server 400 sends a POST response to the mobile terminal 200A. This POST response includes product registration page data corresponding to the URL 22, the cookie file C2 generated in T74, and a GTM. This GTM is similar to the GTM in T38 of FIG. 4 except that its virtual URL generation command includes the URL 22. In a case where the user authentication fails, the web page server 400 does not generate the cookie file C2 and sends to the mobile terminal 200A a POST response that includes web page data indicating that the authentication has failed, instead of the product registration page data.

Figure 11C:
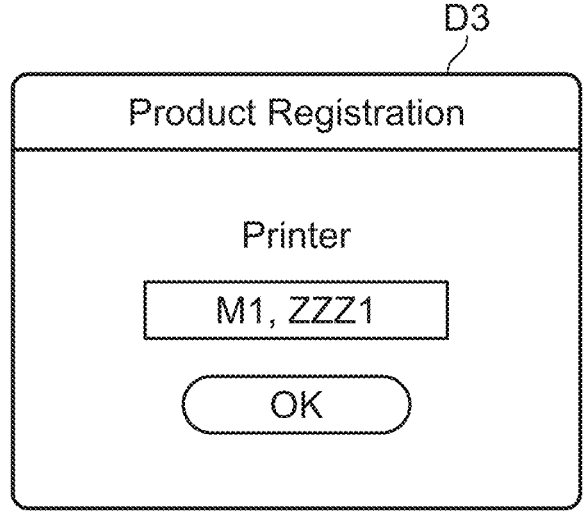
FIG. 11C shows a screen displayed on the mobile terminal.

When receiving the POST response from the web page server 400 in T78, the browser 238A causes the memory 234 in T80 to store the cookie file C2 in the response as a replacement of the cookie file C1 in the memory 234. Then, in T82, the browser 238A causes the display unit 214 to display a product registration page D3 represented by the product registration page data. As shown in FIG. 11C, the page D3 includes a printer input box to which a model name and a serial number of a printer are to be inputted and an OK button. In the printer input box, the model name "M1" and the serial number "ZZZ1" of the printer 100A are already inputted. Due to this, the user can easily register the information of the printer 100A in the management table 602 simply by selecting the OK button. Alternatively, the user may input a model name and a serial number different from the model name "M1" and the serial number "ZZZ1" in the printer input box. Further, the browser 238A generates a virtual URL 24 (http://page.webserver.com/regist?model=M1&serial=ZZZ1) including the URL 22 and the character string 62. Then, processes similar to T40 to T46 of FIG. 4 are executed between the mobile terminal 200A and the log server 700. As a result, the URL 22 is stored in the log server 700.

Figure 6:
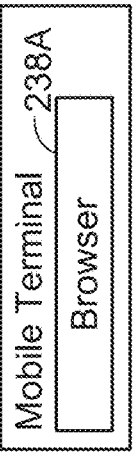
FIG. 6 shows a sequence diagram continued from FIG. 5.

In T90 of FIG. 6, when selection of the OK button is accepted in the state where the model name "M1" and the serial number "ZZZ1" are inputted in the printer input box in the page D3, the browser 238A determines that the model name "M1" and the serial number "ZZZ1" are targets of the product registration and specifies a URL 26 "http://page.webserver.com/registfin" associated with the OK button. Then, the browser 238A determines that the URL 26 includes the domain name "webserver.com" in the cookie file C2, and sends to the web page server 400, in T92, a POST request that includes the URL 26 as a destination URL and further includes the model name "M1", the serial number "ZZZ1", and the cookie file C2.

When receiving the POST request from the mobile terminal 200A in T92, the web page server 400 extracts in T94 the model name "M1", the serial number "ZZZ1", and the ID "UUU1" from the POST request. Then, in T96, the web page server 400 sends the respective extracted pieces of information to the database 600. When receiving the respective pieces of information from the web page server 400, the database 600 determines that the received ID "UUU1" is already registered in the management table 602 and registers the received model name "M1" and serial number "ZZZ1" in association with the ID "UUU1". As a result, the ID "UUU1", the password "PPP1", the model name "M1", and the serial number "ZZZ1" are associated with each other.

In T98, the web page server 400 sends to the mobile terminal 200A a POST response including registration completion page data corresponding to the URL 26 and a GTM. This GTM is similar to the GTM in T38 of FIG. 4 except that its virtual URL generation command includes the URL 26.

When receiving the POST response from the web page server 400 in T98, the browser 238A causes the display unit 214 in T100 to display a product registration completion page represented by the product registration completion page data in the response. This page includes a message indicating that the product registration has been completed. Further, the browser 238A generates a virtual URL 28 (http://page.webserver.com/registfin?model=M1&serial=ZZZ1) including the URL 26 and the character string 62. Then, processes similar to T40 to T46 of FIG. 4 are executed between the mobile terminal 200A and the log server 700. As a result, the URL 26 is stored in the log server 700. FIG. 6 shows the history information 732 including the plurality of URLs 12a, 18, and the like stored in the log server 700 by the processes of FIGS. 3 to 6.

Figure 7:
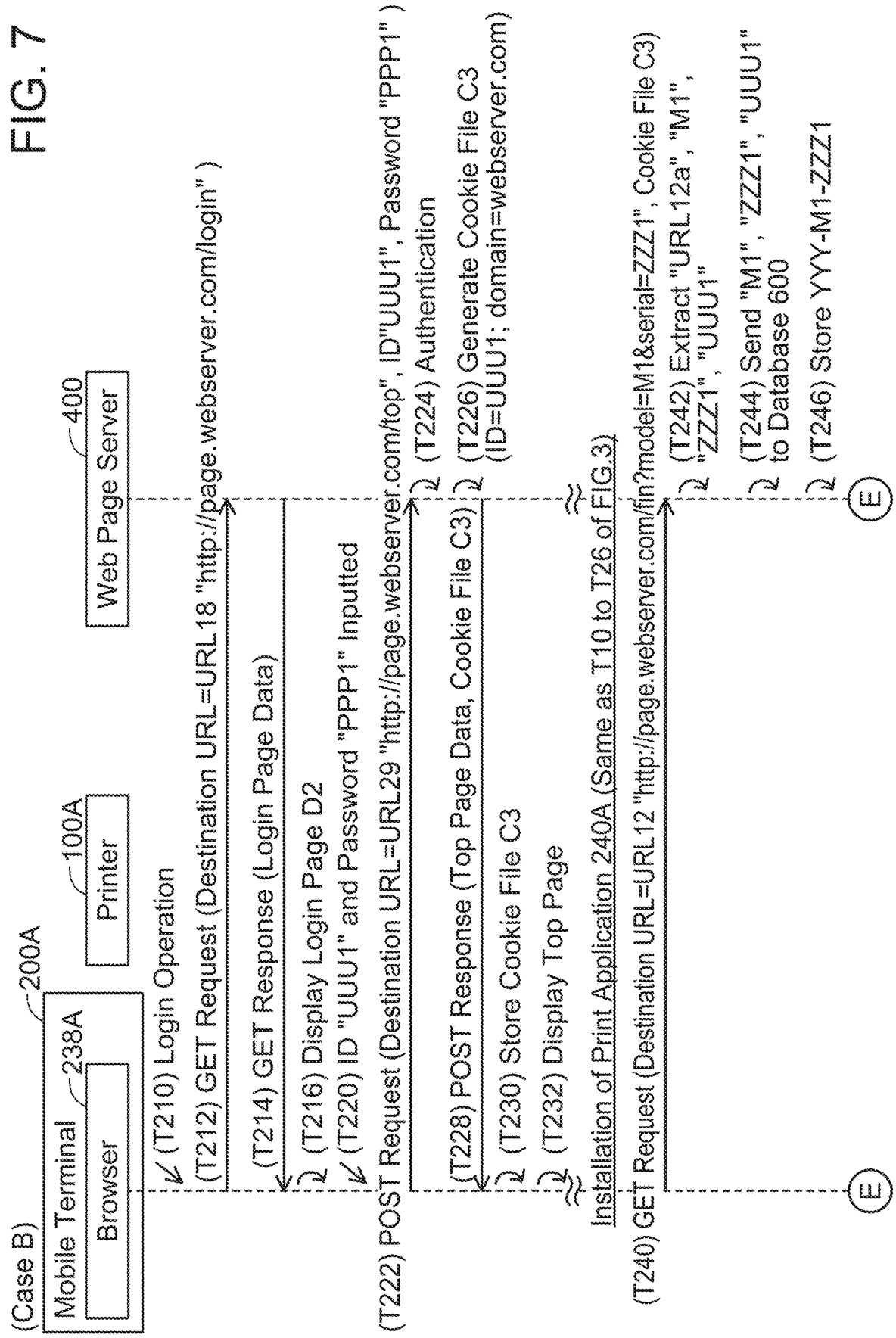
FIG. 7 shows a sequence diagram of Case B in which the installer is activated.
Figure 8:
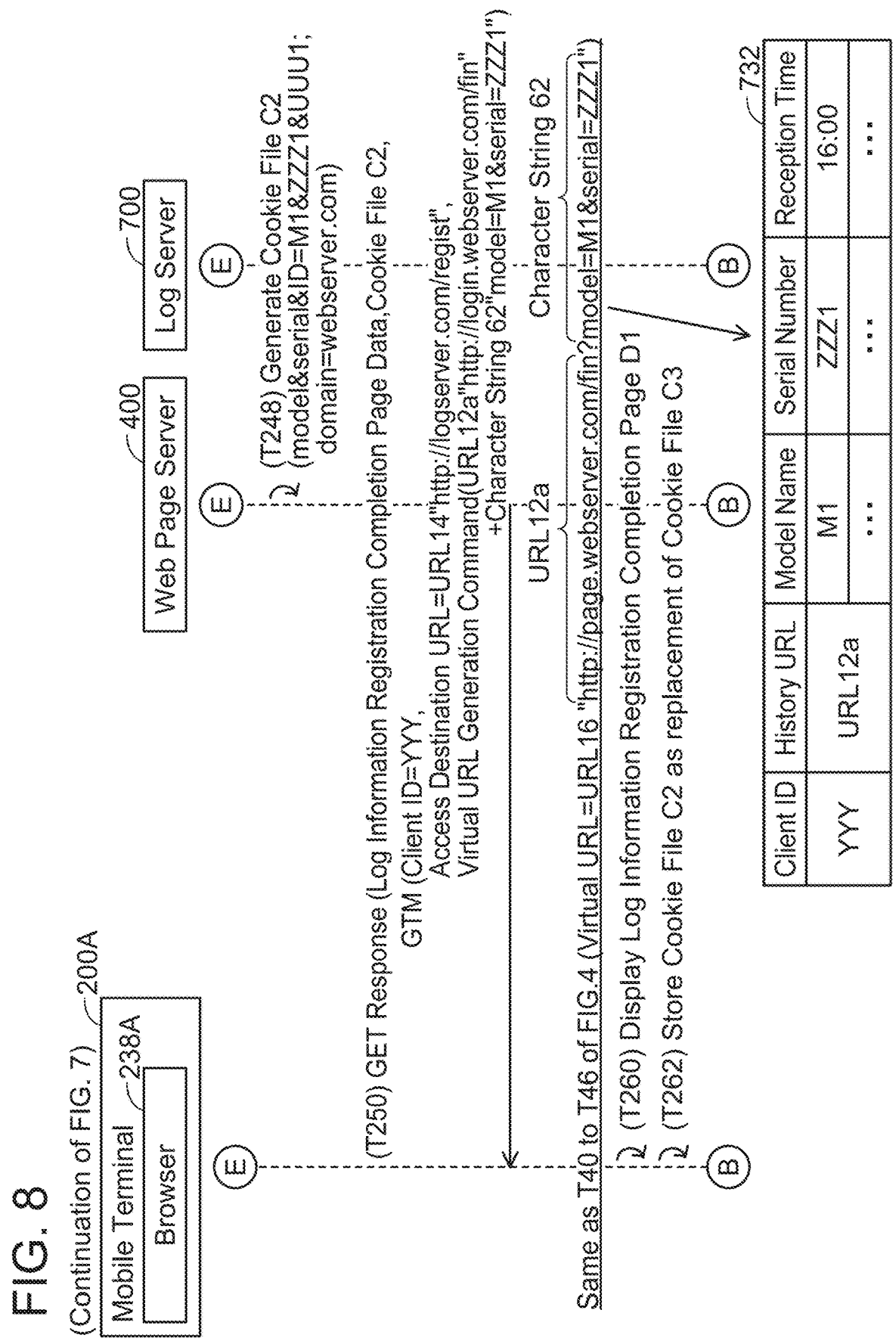
FIG. 8 shows a sequence diagram continued from FIG. 7.

(Case B; FIGS. 7 and 8)

Next, Case B will be described with reference to FIGS. 7 and 8. In Case B, the print app 240A is installed in the mobile terminal 200A after login to the web page server 400 has been completed. An initial state of Case B is similar to the initial state of Case A in FIG. 3.

In T210, the browser 238A accepts a login operation. The login operation includes an operation to activate the browser 238A and an operation to input the URL 18. In this case, the browser 238A sends a GET request including the URL 18 as a destination to the web page server 400 in T212, and receives a GET response including login page data corresponding to the URL 18 from the web page server 400 in T214. T216 and T220 are respectively similar to T66 and T70 of FIG. 5.

In T220, when input of the ID "UUU1" and the password "PPP1" is accepted and further operation on the OK button is accepted, the browser 238A specifies a URL 29 "http://page.webserver.com/top" associated with the OK button. Then, in T222, the browser 238A sends to the web page server 400 a POST request that includes the URL 29 as a destination URL and further includes the ID "UUU1" and the password "PPP1".

T224 is similar to T74 of FIG. 5. In T226, the web page server 400 generates a cookie file C3 by using the ID "UUU1" in the POST request. The web page server 400 describes "UUU1" in the cookie name area (that is, "ID=UUU1") and describes the domain name of the web page server 400 in the domain area (that is, "domain=webserver.com"). In T228, the web page server 400 sends to the mobile terminal 200A a POST response including top page data corresponding to the URL 29 and the cookie file C3.

When receiving the POST response from the web page server 400 in T228, the browser 238A causes the memory 234 to store the cookie file C3 in T230 and then causes the display unit 214 in T232 to display a top page represented by the top page data included in the POST response. After this, processes similar to T10 to T26 of FIG. 3 are executed between the installer 242A, the browser 238A, and the printer 100A, by which the print app 240A is installed in the mobile terminal 200A.

When acquiring the URL 12 from the installer 242A, the browser 238A determines that the URL 12 includes the domain name "webserver.com" in the cookie file C3, and then sends in T240 to the web page server 400 a GET request that includes the URL 12 as a destination URL and further includes the cookie file C3.

When receiving the GET request from the mobile terminal 200A in T240, the web page server 400 extracts in T242 the "URL 12a", the model name "M1", and the serial number "ZZZ1" in the URL 12 and the ID "UUU1" in the cookie file C3. Then, in T244, the web page server 400 sends to the database 600 the respective extracted pieces of information (that is, the model name "M1", the serial number "ZZZ1", and the ID "UUU1"). When receiving the respective pieces of information from the web page server 400, the database 600 determines that the received ID "UUU1" is already registered in the management table 602 and registers the model name "M1" and the serial number "ZZZ1" in association with the ID "UUU1". Due to this, the ID "UUU1", the password "PPP1", the model name "M1", and the serial number "ZZZ1" are associated with each other. T246 is similar to T36 of FIG. 3.

In T248 of FIG. 8, the web page server 400 generates a cookie file C2. The web page server 400 adds the model name "M1" and the serial number "ZZZ1" (that is, "model&serial&ID=M1&ZZZ1=UUU1") to the cookie name area of the cookie file C3. A GET response of T250 is similar to the GET response of T38 of FIG. 4 except that it includes the cookie file C2. Further, processes similar to T40 to T46 of FIG. 4 are executed between the mobile terminal 200A and the log server 700. As a result, the URL 12a is stored in the log server 700. T260 is similar to T50 of FIG. 4.

In T262, the browser 238A causes the memory 234 to store the cookie file C2 included in the GET response of T250 as a replacement of the cookie file C3 in the memory 234. As above, the mobile terminal 200A can store the same cookie file C2, not only in Case A that installs the print app 240A before the login to the web page server 400 is completed (FIGS. 3 to 6) but also in Case B that installs the print app 240A after the login to the web page server 400 is completed (FIGS. 7 and 8).

Figure 9:
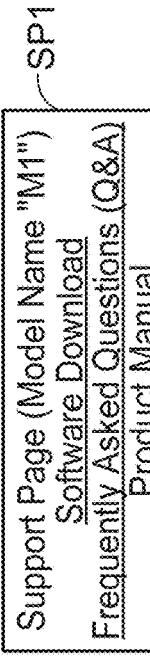
FIG. 9 shows a sequence diagram of Case C in which a support page is designated.

(Case C; FIG. 9)

Next, Case C will be described with reference to FIG. 9. In Case C, the user of the mobile terminal 200A (that is, the user of the printer 100A) accesses a support page by using the mobile terminal 200A. An initial state of Case C is a state after Case A (FIGS. 3 to 6) or Case B (FIGS. 7 and 8), that is, a state in which the mobile terminal 200A already stores the cookie file C2 and the web page server 400 already stores the client ID "YYY", the model name "M1", and the serial number "ZZZ1" in association with each other.

For example in a case where an error occurs in the printer 100A, the user activates the browser 238A of the mobile terminal 200A and then inputs a URL 30 "http://page/webserver.com/support" corresponding to a support page in T310. In this case, the browser 238A refers to the stored cookie file C2 (T80 of FIG. 5 or T262 of FIG. 8) and determines that the URL 30 includes the domain name "webserver.com" in the cookie file C2. Then, in T312, the browser 238A sends to the web page server 400 a GET request that includes the URL 30 as a destination URL and further includes the cookie file C2. Although not shown, in a case where an instruction of designating a URL that does not include the domain name "webserver.com" is given to the mobile terminal 200A by the user, the browser 238A determines that this URL does not include the domain name "webserver.com" in the cookie file C2. In this case, the browser 238A sends a GET request that includes that URL as a destination URL and does not include the cookie file C2.

When receiving the GET request from the mobile terminal 200A in T312, the web page server 400 extracts in T314 the model name "M1", the serial number "ZZZ1", and the ID "UUU1" from the cookie file C2 in the GET request. In this case, the web page server 400 determines that the printer 100A used by the user of the mobile terminal 200A has the model name "M1" and acquires support page data for the printer having the model name "M1" in T316. Then, in T318, the web page server 400 sends to the mobile terminal 200A a GET response including the acquired support page data and a GTM. Due to this, a support page for the printer having the model name "M1" can be displayed in the mobile terminal 200A without the user selecting the model name "M1" from a list of a plurality of model names. Therefore, user convenience can be improved. Further, the aforementioned GTM is similar to the GTM in T38 of FIG. 4 except that its virtual URL generation command includes the URL 30. In a case where the GET request in T312 does not include the cookie file C2, the web page server 400 sends to the mobile terminal 200A a GET response that includes support page data representing a support page including a list of a plurality of model names.

When receiving the GET response from the web page server 400 in T318, the browser 238A causes the display unit 214 in T320 to display a support page SP1 represented by the support page data in the response. The page SP1 includes a message indicating that the page is a support page for the model name "M1", a button indicating software download for the model name "M1", a button indicating a Q&A page for the model name "M1", and a button indicating a product manual for the model name "M1". The user may search for a method to resolve the error occurring in the printer 100A, for example, by selecting the button indicating the Q&A page or the button indicating the product manual.

Further, the browser 238A generates a virtual URL 32 (http://page.webserver.com/support?model=M1&serial=ZZZ1) including the URL 30 and the character string 62. Then, processes similar to T40 to T46 of FIG. 4 are executed between the mobile terminal 200A and the log server 700. As a result, the URL 30 is stored in the log server 700.

(Case D; FIG. 10)

Next, Case D will be described with reference to FIG. 10. In Case D, the user of the mobile terminal 200B (that is, the user of the printer 100B) accesses a support page by using the mobile terminal 200B. An initial state of Case D is a state after processes similar to T10 to T100 (FIGS. 3 to 6) have been executed between the installer 242B and the browser 238B of the mobile terminal 200B, the web page server 400, and the log server 700. However, the user selects the printer name "AAA2" of the printer 100B in the selection screen S1 in T18 of FIG. 3. Further, a memory (not shown) of the mobile terminal 200B stores a cookie file C12 including the model name "M2" and the serial number "ZZZ2" of the printer 100B. The model name "M2" and the serial number "ZZZ2" (that is, "model&serial=M2&ZZZ2") are described in the cookie name area of the cookie file C12, and the domain name of the web page server 400 (that is, "domain=webserver.com") is described in the domain name area thereof. Further, in the web page server 400, the client ID "YYY", the model name "M2", and the serial number "ZZZ2" are stored in association with each other.

T410 to T414 are similar to T310 to T314 of FIG. 9 except that the communication counterpart is the mobile terminal 200B. In this case, the web page server 400 determines that the printer 100B used by the user of the mobile terminal 200B has the model name "M2" and acquires support page data for the printer having the model name "M2" in T416. Then, in T418, the web page server 400 sends to the mobile terminal 200B a GET response including the acquired support page data and a GTM. Due to this, a support page for the printer having the model name "M2" can be displayed in the mobile terminal 200B without the user selecting the model name "M2" from a list of a plurality of model names. Due to this, the user convenience is improved. Further, the aforementioned GTM is similar to the GTM in T38 of FIG. 4 except that its virtual URL generation command includes the URL 30 and a character string 162 (that is, "model=M2&serial=ZZZ2").

When receiving the GET response from the web page server 400 in T418, the browser 238B causes the display unit 214 in T420 to display a support page SP2 represented by the support page data in the response. The page SP2 is similar to the page SP1 displayed in T320 of FIG. 9 except that it is a support page for the model name "M2".

(Effects of First Embodiment)

When the web page server 400 receives the GET request including the model name "M1" of the printer 100A from the mobile terminal 200A (T312 of FIG. 9), it uses the model name "M1" in the GET request to acquire the support page data for the model name "M1" (T316). Then, the web page server 400 sends the support page data for the model name "M1" to the mobile terminal 200A (T318). In this case, the mobile terminal 200A displays the support page SP1 for the model name "M1" corresponding to the printer 100A (T320). Further, when the web page server 400 receives the GET request including the model name "M2" of the printer 100B from the mobile terminal 200B (T412 of FIG. 10), it uses the model name "M2" in the GET request to acquire the support page data for the model name "M2" (T416). Then, the web page server 400 sends the support page data for the model name "M2" to the mobile terminal 200B (T418). In this case, the mobile terminal 200B displays the support page SP2 for the model name "M2" corresponding to the printer 100B (T420). As such, the web page server 400 can send the pieces of the support page data corresponding respectively to the printer 100A and the printer 100B (that is, the pages SP1 and SP2) to the mobile terminal 200A and the mobile terminal 200B, respectively.

(Corresponding Relationships)

The web page server 400 is an example of "server". The mobile terminal 200A is an example of "first terminal device" and "first external device". The mobile terminal 200B is an example of "second terminal device" and "second external device". The printer 100A and the printer 100B are respectively examples of "first peripheral device" and "second peripheral device". The model name "M1" of the printer 100A and the model name "M2" of the printer 100B are respectively examples of "first relative information" and "second relative information". The cookie file C2 and the cookie file C12 are respectively examples of "first specific information" and "second specific information". The user of the mobile terminal 200A and the user of the mobile terminal 200B are respectively examples of "first user" and "second user". The support page data for the model name "M1" and the support page data for the model name "M2" are respectively examples of "first output data" and "second output data". The GET request in T312 of FIG. 9 and the GET request in T412 of FIG. 10 are respectively examples of "first specific signal" and "second specific signal".

The GET requests in T30 of FIG. 3 and T240 of FIG. 7 are examples of "first signal". The domain name "webserver.com" is an example of "domain of a server". The support pages SP1, SP2 are examples of "specific web page". The URL 30 and the URL 32 are respectively examples of "first URL" and "second URL". The designations of the support pages in T310 of FIG. 9 and in T410 of FIG. 10 are examples of "instruction by the user". The GTM is an example of "command including the first URL and the relative information".

T312 of FIG. 9 and T412 of FIG. 10 are examples of "receive a specific signal". T38 of FIG. 2, T318 of FIG. 9, and T418 of FIG. 10 are examples of "acquire output data". T318 of FIG. 9 and T418 of FIG. 10 are examples of "send the acquired output data".

In another aspect, the GET request in T30 is an example of "specific signal". The cookie file C1 is an example of "output data". T30 and T34 of FIG. 3 and T38 of FIG. 4 are respectively examples of "receive a specific signal", "acquire output data", and "send the acquired output data".

Second Embodiment

As shown in FIG. 1, in the present embodiment, the communication system 2 further includes a data server 500 provided on the Internet 4.

Figure 12:
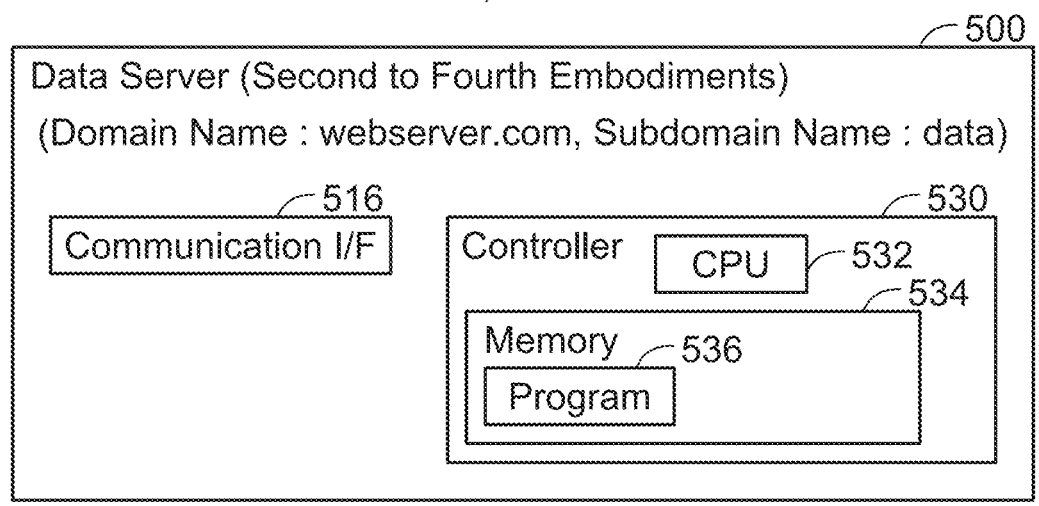
FIG. 12 shows a configurational diagram of a data server.

(Configuration of Data Server 500; FIG. 12)

A configuration of the data server 500 will be described with reference to FIG. 12. The data server 500 is a server that is provided on the Internet 4 by the printer vendor and is configured to supply an image file representing a print target image. A domain name and a subdomain name of the data server 500 are respectively "webserver.com" and "data".

As shown in FIG. 12, the data server 500 includes a communication I/F 516 and a controller 530. The communication I/F 516 is connected to the Internet 4. The controller 530 includes a CPU 532 and a memory 534. The CPU 532 is configured to execute various processes according to a program 536 stored in the memory 534. The memory 534 is constituted of a ROM, a RAM, and the like. Further, although not shown, the memory 534 stores various types of web page data. The data server 500 is configured to supply the web page data in the memory 534 to the mobile terminals 200 according to requests from the mobile terminals 200.

Figure 13:
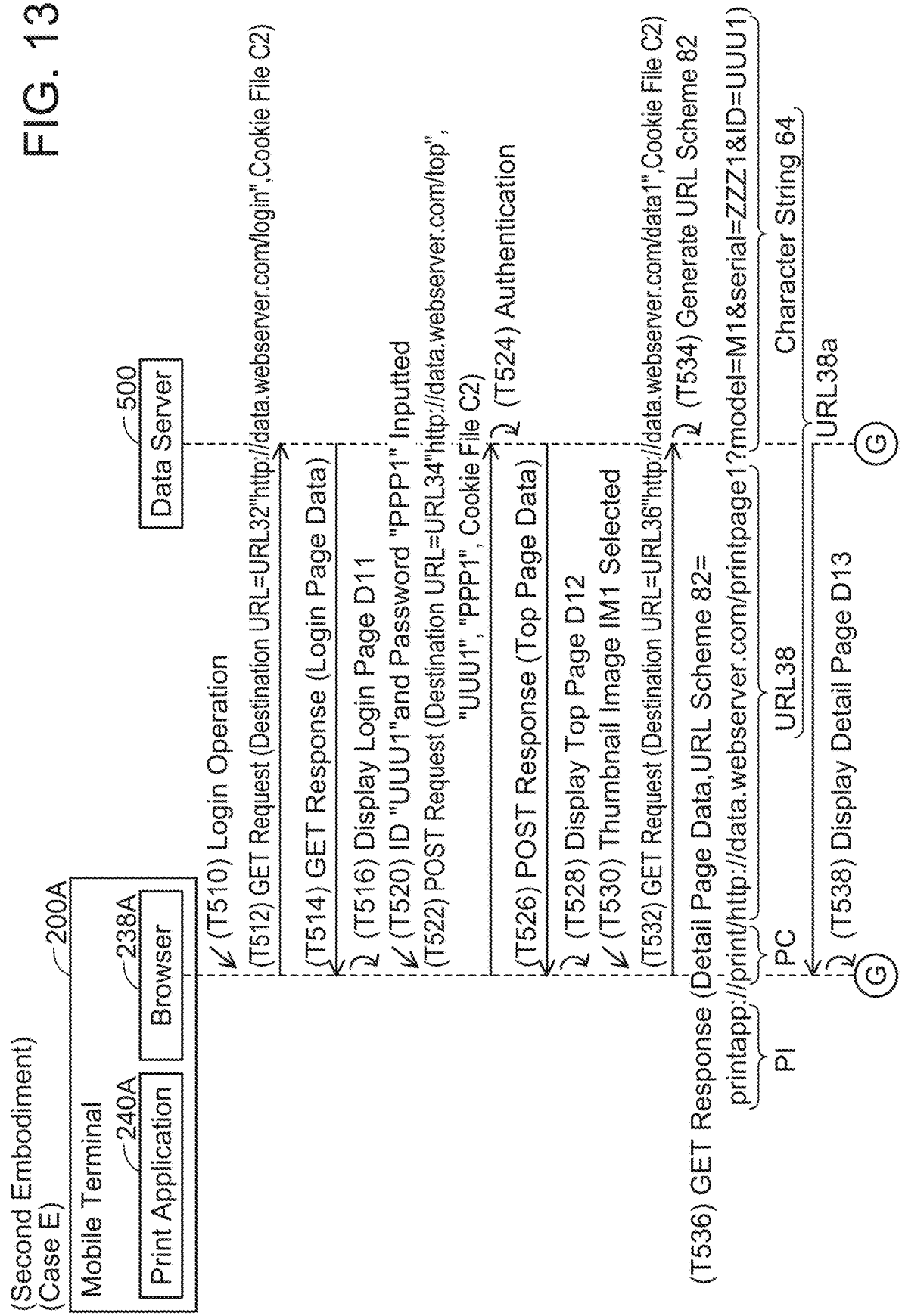
FIG. 13 shows a sequence diagram of Case E according to a second embodiment.
Figure 14:
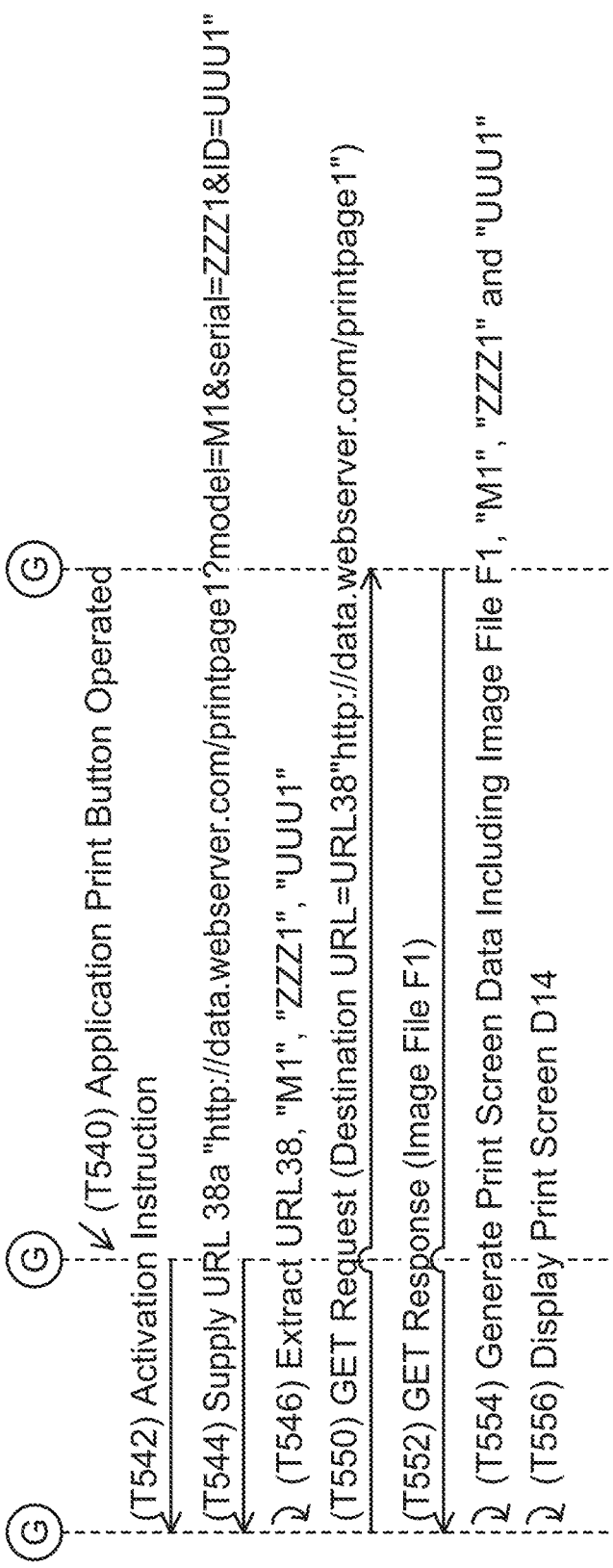
FIG. 14 shows a sequence diagram continued from FIG. 13.

(Case E; FIGS. 13 and 14)

Next, Case E will be described with reference to FIGS. 13 and 14. In Case E, an image represented by print data is printed by using the print app 240A installed in the mobile terminal 200A. An initial state of Case E is a state after FIG. 6 or FIG. 8, that is, a state in which the memory 234 of the mobile terminal 200A already stores the cookie file C2.

Figure 16A:
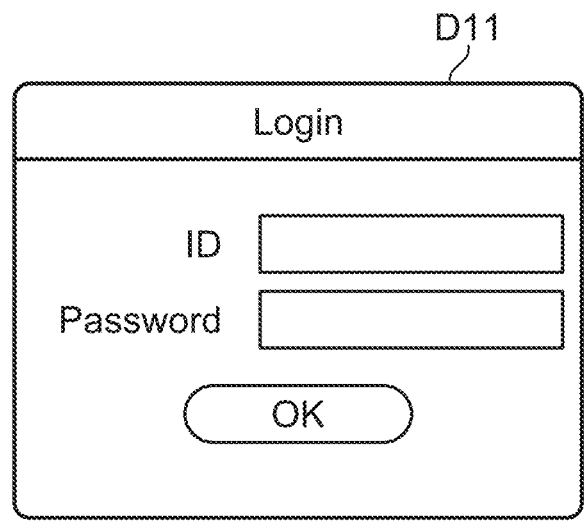
FIG. 16A shows a screen displayed on a mobile terminal according to the second embodiment.

In T510, the browser 238A accepts a login operation. The login operation includes the operation to activate the browser 238A and an operation to input the URL 32 "http://data.webserver.com/login". In this case, the browser 238A determines that the URL 32 includes the domain name "webserver.com" in the cookie file C2, sends in T512 to the data server 500 a GET request that includes the URL 32 as a sending destination URL and further includes the cookie file C2, and receives in T514 a GET response including login page data corresponding to the URL 32 from the data server 500. In T516, the browser 238A causes the display unit 214 to display a login page D11 represented by the login page data. As shown in FIG. 16A, the page D11 includes an ID input box to which an ID is to be inputted, a password input box to which a password is to be inputted, and an OK button. In FIGS. 16A to 16D, pages D11 to D13 outlined by narrow lines are pages displayed in accordance with the browser 238A, and a screen D14 outlined by a bold line is a screen displayed in accordance with the print app 240A. T520 to T524 are similar to T220 to T224 of FIG. 7 except that the communication counterpart is the data server 500.

When the authentication of the user succeeds in T524, the data server 500 sends in T526 to the mobile terminal 200A a POST response including top page data corresponding to a URL 34 "http://data.webserver.com/top".

Figure 16B:
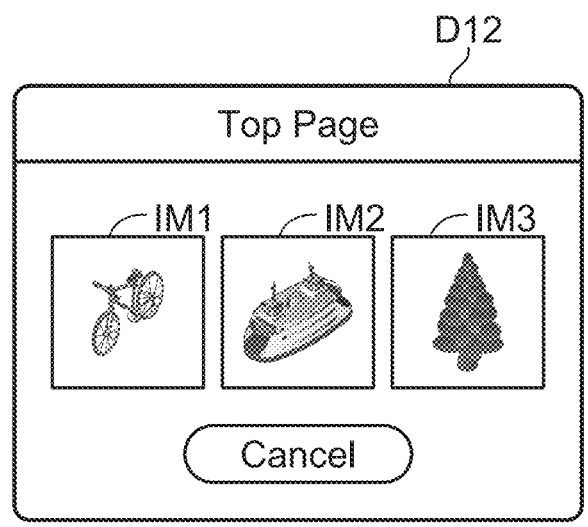
FIG. 16B shows a screen displayed on the mobile terminal according to the second embodiment.

When receiving the POST response from the data server 500 in T526, the browser 238A causes the display unit 214 in T528 to display a top page D12 represented by the top page data in the response. As shown in FIG. 16B, the page D12 includes a plurality of thumbnail images IM1 to IM3 and a cancel button. The user can select one thumbnail image from among the plurality of thumbnail images IM1 to IM3 as a print target. When selection of the thumbnail image IM1 is accepted in T530, the browser 238A specifies a URL 36 "http://data.webserver.com/data1" associated with the thumbnail image IM1. Here, a character string "data1" is a character string corresponding to the thumbnail image IM1. That is, for example, when the thumbnail image IM2 is selected, a URL including a character string "data2", instead of the character string "data1", is specified. Then, the browser 238A determines that the URL 36 includes the domain name "webserver.com" in the cookie file C2 and sends in T532 to the data server 500 a GET request that includes the URL 36 as a destination and further includes the cookie file C2.

When receiving the GET request from the mobile terminal 200A in T532, the data server 500 extracts the model name "M1", the serial number "ZZZ1", and the ID "UUU1" from the cookie file C2 in the GET request and generates a URL scheme 82 in T534. The URL scheme 82 is a character string indicating instruction information to the browser 238A of the mobile terminal 200A, and includes a program name PI indicating a name of the print app 240A, a process content PC indicating a print process, a URL 38 which the print app 240A is to access, and a character string 64 indicating the respective extracted pieces of information. Since the cookie file C2 includes the model name "M1" and the serial number "ZZZ1", the data server 500 firstly determines that the processes according to the installer 242A have been executed, that is, that the print app 240A is already installed in the mobile terminal 200A. Due to this, the data server 500 determines that the mobile terminal 200A is capable of executing print by using the print app 240A, specifies a character string "printapp" for activating the printer app 240A as the program name PI, and specifies "print" indicating the print process as the process content PC. Further, the data server 500 specifies the URL 38 "http://data.webserver.com/printpage1" corresponding to the character string "data1" included in the GET request. Here, a character string "printpage1" is a character string corresponding to the character string "data1". That is, for example, in a case where the GET request includes the character string "data2" instead of the character string "data1", a URL including a character string "printpage2", instead of the character string "printpage1", is specified. Then, the data server 500 uses the URL 38 and the respective extracted pieces of information to generate a URL 38a "http://data.webserver.com/printpage1?model=M1&serial=ZZZ1&ID=UUU1". The data server 500 further uses the specified program name PI, the specified process content PC, and the generated URL38a to generate the URL scheme 82. Further, the data server 500 generates detail page data by describing the model name "M1" and the serial number "ZZZ1" in page data corresponding to the URL 36 in the GET request.

In T536, the data server 500 sends to the mobile terminal 200A a GET response including the generated detail page data and the generated URL scheme 82. In a case where the GET request does not include a cookie file, the data server 500 does not generate a URL scheme.

Figure 16C:
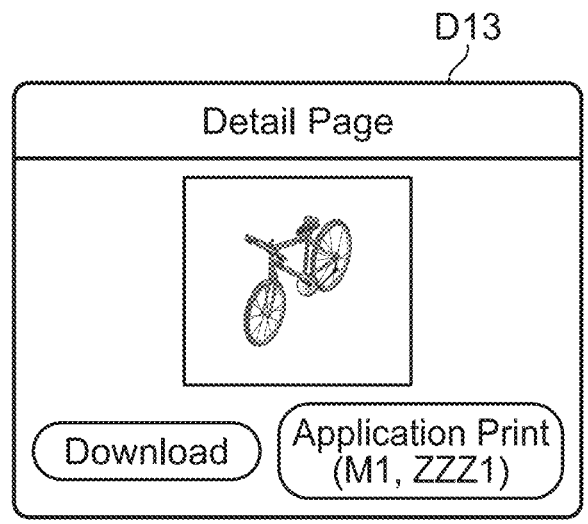
FIG. 16C shows a screen displayed on the mobile terminal according to the second embodiment.

When receiving the GET response from the data server 500 in T536, the browser 238A causes the display unit 214 in T538 to display a detail page D13 represented by the detail page data. As shown in FIG. 16C, the page D13 includes an enlarged image of the thumbnail image IM1, a download button, and an app print button for executing print by using the print app 240A (hereinbelow termed "app print"). The app print button has the model name "M1" and the serial number "ZZZ1" of the printer 100A described thereon. Due to this, the user can be informed of the printer 100A in which the print is to be executed. In a case where the app print button is selected, the browser 238A executes a process in accordance with the URL scheme 82. Further, in a case where the download button is selected, the 238A downloads image data corresponding to the thumbnail image IM1.

When the app print button is operated in T540 of FIG. 14, the browser 238A executes the process in accordance with the URL scheme 82 included in the GET response of T536. Firstly, the browser 238A extracts the program name PI "printapp", the process content PC "print", and the URL 38a "http://data.webserver.com/printpage1?model=M1&serial=ZZZ1&ID=UUU1" from the URL scheme 82. Then, in T542, the browser 238A supplies to the print app 240A an activation instruction for activating the print app 240A that corresponds to the extracted program name PI. The print app 240A is thereby activated. Then, the browser 238A supplies the extracted URL 38a to the print app 240A.

When acquiring the URL 38a from the browser 238A in T544, the print app 240A extracts in T546 the URL 38, the model name "M1", the serial number "ZZZ1", and the ID "UUU1" from the URL 38a, and sends in T550 to the data server 500 a GET request including the URL 38 as a destination URL.

When receiving the GET request from the mobile terminal 200A in T550, the data server 500 sends in T552 to the mobile terminal 200A a GET response including an image file F1 corresponding to the character string "printpage1" in the GET request (that is, an image file corresponding to the thumbnail image IM1).

Figure 16D:
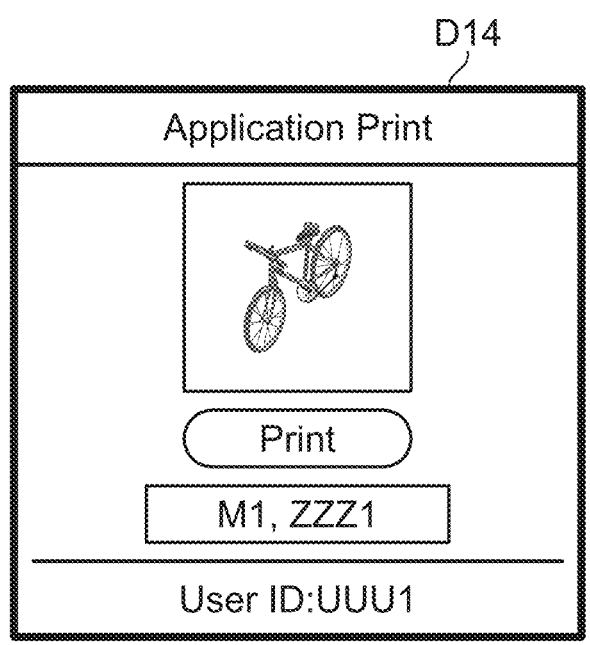
FIG. 16D shows a screen displayed on the mobile terminal according to the second embodiment.

When receiving the GET response from the data server 500 in T552, the print app 240A generates in T554 print screen data that includes the image file F1 in the GET response and the respective pieces of information extracted in T546 (that is, the model name "M1", the serial number "ZZZ1", and the ID "UUU1"). In T556, the print app 240A causes the display unit 214 to display a print screen D14 represented by the generated print screen data. As shown in FIG. 16D, the screen D14 includes an enlarged image of the thumbnail image IM1, a print button, printer information indicating the model name "M1" and the serial number "ZZZ1" of the printer 100A, and the user information indicating the ID "UUU1". Due to this, the user can be informed of the print target image, the printer 100A in which the print is to be executed, and the ID of the user.

Although not shown, when the print button is operated by the user, the print app 240A converts the image file F1 included in the GET response of T552 and generates print data which the printer 100A is capable of interpreting. Then, the print app 240A sends the print data to the printer 100A. As a result, print according to the print data is executed in the printer 100A.

Figure 15:
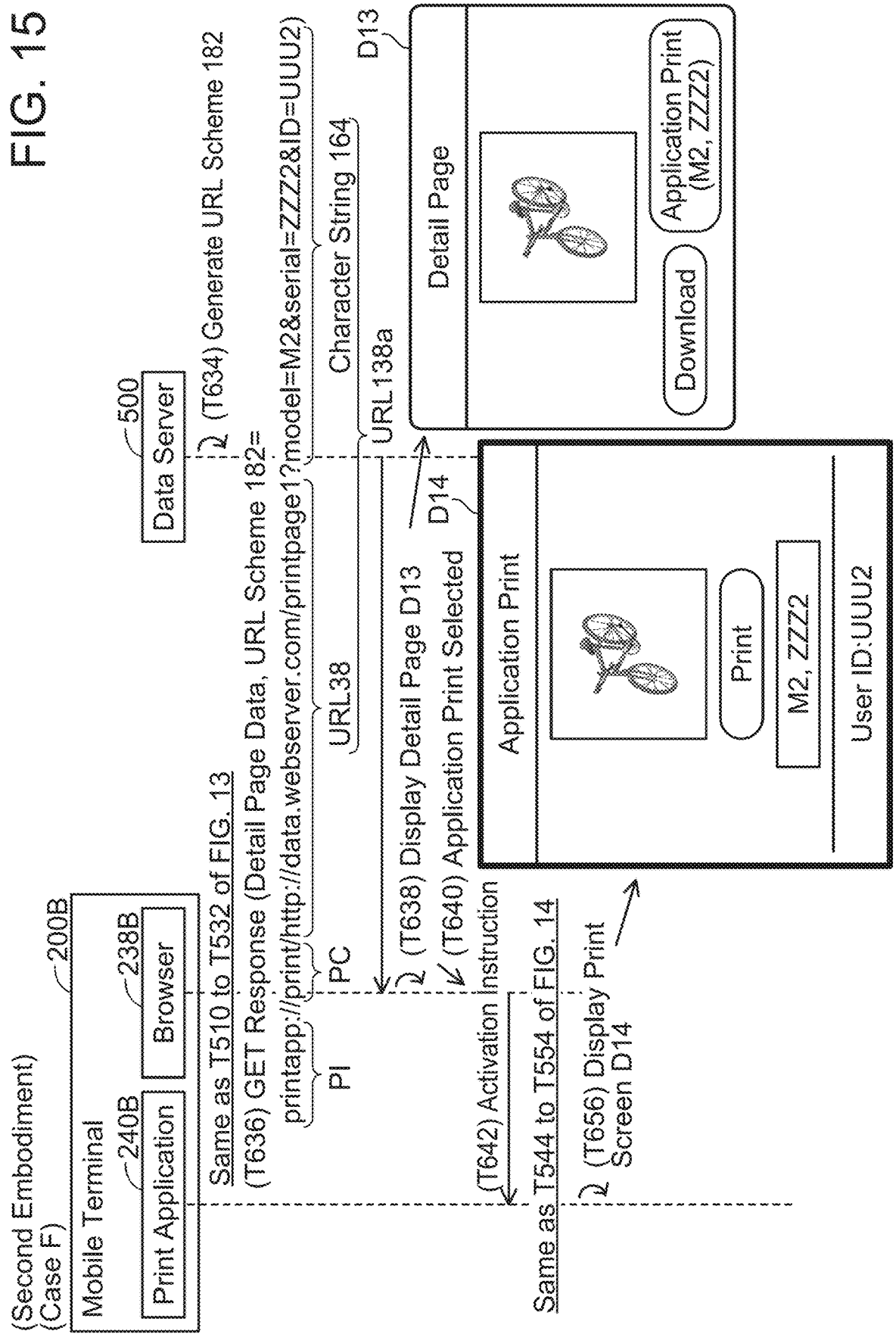
FIG. 15 shows a sequence diagram of Case F according to the second embodiment.

(Case F; FIG. 15)

Next, Case F will be described with reference to FIG. 15. In Case F, an image represented by print data is printed by using the print app 240B installed in the mobile terminal 200B. An initial state of Case F is similar to the initial state of Case D. That is, the mobile terminal 200B already stores the cookie file C12.

When processes similar to T510 to T532 of FIG. 13 are executed between the mobile terminal 200B and the data server 500, the data server 500 generates a URL scheme 182 in T634. The URL scheme 182 is similar to the URL scheme 82 except that it includes a URL 138a (specifically, a character string 164 "model=M2&serial=ZZZ2&ID=UUU2"). A character string "printapp" included in the URL scheme 182 is also a character string for activating the print app 240B. Further, the data server 500 generates detail page data by describing the model name "M2" and the serial number "ZZZ2" in page data corresponding to the URL 36 in the GET request. T636 and T638 are respectively similar to T536 and T538 of FIG. 13 except that the communication counterpart is the mobile terminal 200B. In the present case, the model name "M2" and the serial number "ZZZ2" of the printer 100B are described on the app print button in the detail page D13. Due to this, the user can be informed of the printer 100B in which print is to be executed. T640 is similar to T540 of FIG. 14. In this case, in T642, the browser 238B supplies the print app 240B with an activation instruction for activating the print app 240B corresponding to the extracted program name PI. Due to this, the print app 240B is activated. After this, processes similar to T544 to T554 of FIG. 14 are executed between the browser 238B, the print app 240B, and the data server 500. The print app 240B generates in T554 print screen data including the image file F1, the model name "M2", the serial number "ZZZ2", and the ID "UUU2" in the GET request. In this case, the print app 240B causes the display unit 214 in T656 to display a print screen D14 represented by the generated print screen data. This screen D14 includes an enlarged image of the thumbnail image IM1, a print button, and printer information indicating the model name "M2" and the serial number "ZZZ2" of the printer 100B, and the user information indicating the ID "UUU2". Due to this, the user can be informed of the print target image, the printer 100B in which the print is to be executed, and the ID of the user.

Although not shown, when the print button is operated by the user, the print app 240B converts the image file F1 included in the GET response of T552 and generates print data which the printer 100B is capable of interpreting. Then, the print app 240B sends the print data to the printer 100B. As a result, the print according to the print data is executed in the printer 100B.

(Effects of Second Embodiment)

In the present embodiment, when the data server 500 receives the GET request including the model name "M1" and the serial number "ZZZ1" of the printer 100A from the mobile terminal 200A (T532 of FIG. 13), it acquires the URL scheme 82 corresponding to the model name "M1" and the serial number "ZZZ1" in the GET request (T534). Then, the data server 500 sends the GET response including the URL scheme 82 to the mobile terminal 200A (T536). After this, when the app print button is operated by the user of the mobile terminal 200A, the mobile terminal 200A activates the print app 240A and causes the printer 100A to execute the print. Further, when the data server 500 receives the GET request including the model name "M2" and the serial number "ZZZ2" of the printer 100B from the mobile terminal 200B, it acquires the URL scheme 182 corresponding to the model name "M2" and the serial number "ZZZ2" in the GET request (T634 of FIG. 15). Then, the data server 500 sends the GET response including the URL scheme 182 to the mobile terminal 200B (T636). After this, when the app print button is operated by the user of the mobile terminal 200B, the mobile terminal 200B activates the print app 240B and causes the printer 100B to execute the print. As above, the data server 500 can send the URL schemes corresponding respectively to the printer 100A and the printer 100B (that is, the URL scheme 82 and the URL scheme 182) to the mobile terminal 200A and the mobile terminal 200B respectively.

(Corresponding Relationships)

The detail page data including the URL scheme 82 and the detail page data including the URL scheme 182 are respectively examples of "first output data" and "second output data". The print app 240A and the print app 240B are examples of "specific application". The GET request in T522 of FIG. 13 is an example of "second signal". The ID "UUU1" and the password "PPP1" are examples of "login information". The ID "UUU1" and the ID "UUU2" are examples of "user information". The detail page D13 is an example of "specific web page".

Third Embodiment

In the present embodiment, the mobile terminal 200A is provided with a print application 241A (hereinbelow termed "print app 241A") and an installer 243A (see FIG. 2A) instead of the print app 240A and the installer 242A. The print app 241A is an application for supplying print data representing a print target image to a printer (e.g., 100A). The installer 243A is a program for installing the print app 241A to the mobile terminal 200A. Further, the mobile terminal 200B is provided with a print application 241B (hereinbelow termed "print app 241B") and an installer 243B (see FIG. 2B) instead of the print app 240B and the installer 242B.

Figure 17:
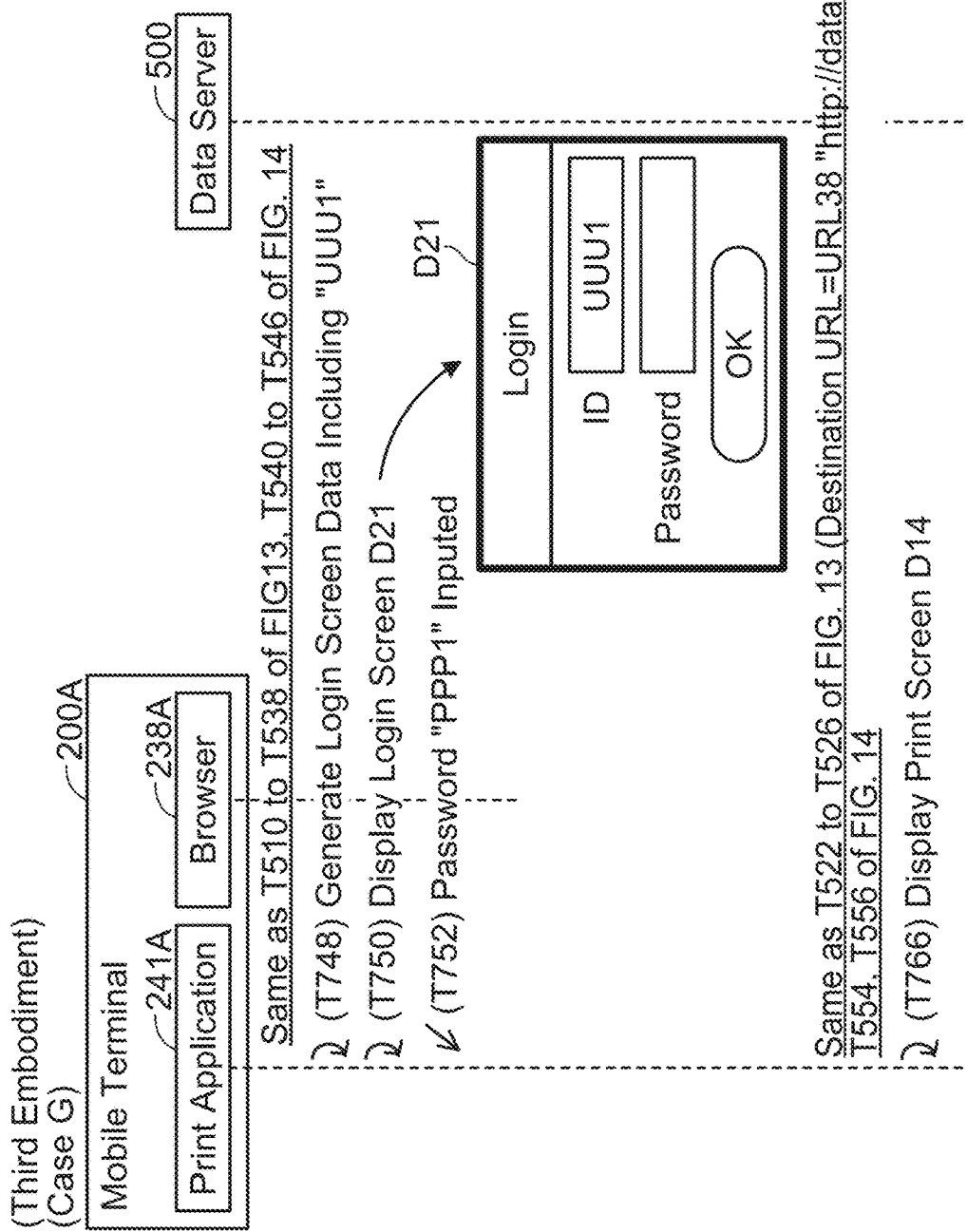
FIG. 17 shows a sequence diagram of Case G according to a third embodiment.

(Case G; FIG. 17)

Case G will be described with reference to FIG. 17. In Case G, an image represented by print data is printed by using the print app 241A installed in the mobile terminal 200A. An initial state of Case G is a state after processes similar to T10 to T100 (FIGS. 3 to 6) have been executed between the installer 243A and the browser 238A of the mobile terminal 200A, the web page server 400, and the log server 700. That is, it is a state in which the memory 234 of the mobile terminal 200A already stores the cookie file C2. Further, the print app 241A stores login screen data.

Processes similar to T510 to T538 of FIG. 13 and T540 to T546 of FIG. 14 are executed between the mobile terminal 200A and the data server 500. The character string "printapp" included in the URL scheme 82 generated in T534 is a character string for activating the print app 241A. Due to this, when the app print button is operated in T540, the browser 238A supplies the print app 241A in T542 with an activation instruction for activating the print app 241A corresponding to the extracted program name PI. The print app 241A is thereby activated.

When extracting the URL 38 and the respective pieces of information (that is, the model name "M1", the serial number "ZZZ1", and the ID "UUU1") in T546, the print app 241A determines that the URL 38 includes the subdomain name "data" and the domain name "webserver.com", and specifies login screen data corresponding to the data server 500. Then, the print app 241A generates in T748 login screen data including the ID "UUU1" by describing the ID "UUU1" in the specified login screen data, and causes the display unit 214 in T750 to display a login screen D21 represented by the generated login screen data. The ID "UUU1" of the user is already inputted in an ID input box of the login screen D21. As such, the user does not have to input the ID and simply needs to input the password. When input of the password "PPP1" is accepted and an operation on the OK button is further accepted in T752, the print app 241A specifies the URL 38 "http://data.webserver.com/printpage1" associated with the OK button. After this, processes similar to T522 to T526 of FIG. 13 are executed between the print app 241A and the data server 500. In this case, the print app 241A receives a POST response that includes the image file F1 corresponding to the character string "printpage1" in the URL 38 from the data server 500. Then, processes similar to T554 and T556 of FIG. 14 are executed on the image file F1, by which print screen data including the model name "M1", the serial number "ZZZ1", and the ID "UUU1" is generated. Then, in T766, the print app 240A causes the display unit 214 to display the print screen D14 (see FIG. 16D) represented by the generated print screen data.

Although not shown, when the mobile terminal 200B accepts a login operation for logging into the data server 500, processes similar to those of FIG. 17 are executed between the mobile terminal 200B (specifically, the print app 241B and the browser 238B) and the data server 500. In this case, the data server 500 generates the URL scheme 182 "printapp://print/http://data.webserver.com/login_printpage1?model=M2&serial=ZZZ2&ID=UUU2" including the character string 164 (that is "model=M2&serial=ZZZ2&ID=UUU2") instead of the URL scheme 82, and sends a GET response including this URL scheme to the mobile terminal 200B. Therefore, in this embodiment as well, effects similar to those of the second embodiment can be achieved.

Fourth Embodiment

As shown in FIG. 1, in the present embodiment, the communication system 2 is further provided with a material server 800 provided on the Internet 4.

The material server 800 is provided on the Internet 4 by a business entity different from the printer vendor and is a server for supplying an image file representing a print target image. A domain name of the material server 800 is "sozaiserver.com".

Figure 18:
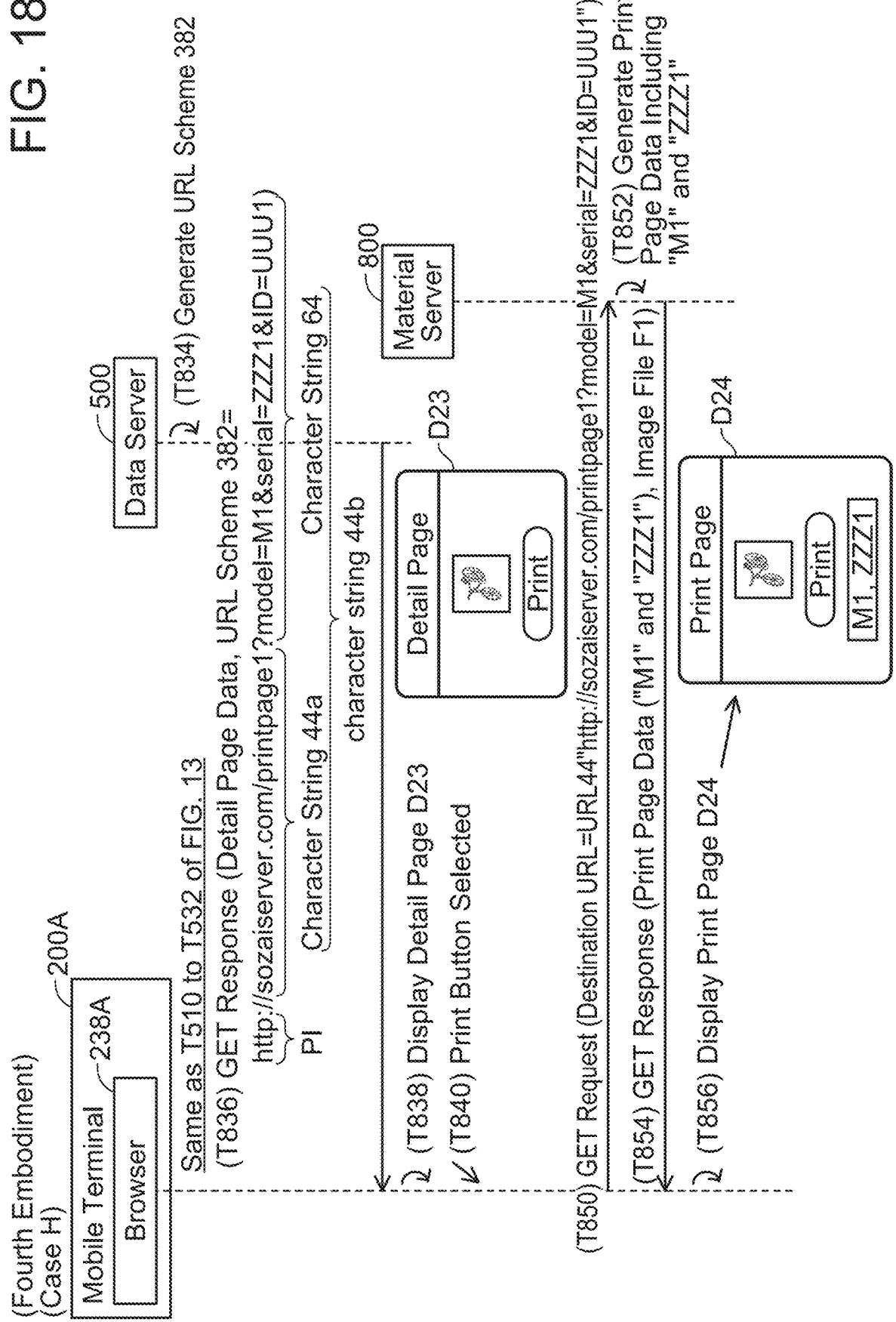
FIG. 18 shows a sequence diagram of Case H according to a fourth embodiment.

(Case H; FIG. 18)

Case H will be described with reference to FIG. 18. In Case H, an image represented by print data is printed by using the print app 240A installed in the mobile terminal 200A. An initial state of Case H is similar to the initial state of Case E of FIG. 13. That is, it is a state in which the memory 234 of the mobile terminal 200A already stores the cookie file C2.

When processes similar to T510 to T532 of FIG. 13 are executed between the mobile terminal 200A and the data server 500, the data server 500 generates a URL scheme 382 in T834. In the present case, the image file F1 of the thumbnail image IM1 is stored in the material server 800. In this case, the data server 500 determines that the image file F1 of the thumbnail image IM1 selected by the user is stored in the material server 800 and specifies a URL "http://sozaiserver.com/printpage1" corresponding to the thumbnail image IM1. Then, the data server 500 specifies a character string "http" for executing communication according to a Hypertext Transfer Protocol (HTTP) as the program name PI and specifies a character string 44a "sozaiserver.com/printpage1" from the specified URL as an access destination. Then, the data server 500 generates a character string 44b "sozaiserver.com/printpage1?model=M1&serial=ZZZ1&ID=UUU1" by using the specified character string 44a and the respective extracted pieces of information. Further, the data server 500 generates the URL scheme 382 by using the specified program name PI and the generated character string 44b.

In T836, the data server 500 sends to the mobile terminal 200A a GET response including detail page data corresponding to the URL 36 in the GET request and the generated URL scheme 382.

When receiving the GET response from the data server 500 in T836, the browser 238A causes the display unit 214 in T838 to display a detail page D23 represented by the detail page data. The page D23 includes an enlarged image of the thumbnail image IM1 and a print button. The browser 238A executes processes according to the URL scheme 382 in a case where the print button is selected.

When the print button is operated in T840, the browser 238A executes processes according to the URL scheme 382 included in the GET response of T836. The browser 238A firstly extracts the program name PI "http" and the character string 44b "sozaiserver.com/printpage1?model=M1&serial=ZZZ1&ID=UUU1" from the URL scheme 382. Then, the browser 238A specifies to execute communication in accordance with the HTTP and specifies a URL 44 "http://sozaiserver.com/printpage1?model=M1&serial=ZZZ1&ID=UUU1" including the character string 44b as a destination URL. Then, in T850, the browser 238A sends a GET request including the URL 44 as the destination URL to the material server 800.

When receiving the GET request from the mobile terminal 200A in T850, the material server 800 extracts the URL "http://sozaiserver.com/printpage1", the model name "M1", the serial number "ZZZ1", and the ID "UUU1" from the GET request and specifies page data corresponding to the extracted URL. Then, in T852, the material server 800 generates print page data by describing the model name "M1" and the serial number "ZZZ1" in the specified page data. Then, in T854, the material server 800 sends to the mobile terminal 200A a GET response including the generated print page data and the image file F1 corresponding to the character string "printpage1" in the GET request (that is, the image file corresponding to the thumbnail image IM1).

When receiving the GET response from the material server 800 in T854, the browser 238A causes the display unit 214 in T856 to display a print page D24 represented by the print page data. This page D24 includes an enlarged image of the thumbnail image IM1, a print button, and printer information indicating the model name "M1" and the serial number "ZZZ1" of the printer 100A. Due to this, the user can be informed of the print target image and the printer 100A in which the print is to be executed.

Although not shown, when the mobile terminal 200B accepts the login operation for logging into the data server 500, processes similar to those of FIG. 18 are executed between the mobile terminal 200B and the data server 500. In this case, the data server 500 generates a URL scheme "http://sozaiserver.com/printpage1?model=M2&serial=ZZZ2&ID=UUU2" including a character string 164 (that is, "model=M2&serial=ZZZ2&ID=UUU2") instead of the URL scheme 382, and sends a GET response including this URL scheme to the mobile terminal 200B. As such, in the present embodiment as well, effects similar to those of the second embodiment can be achieved.

(Corresponding Relationships)

The URL scheme 382 and the URL scheme including the character string 164 are respectively examples of "first output data" and "second output data". The detail page D23 is an example of "specific web page". T834 and T836 of FIG. 18 are respectively examples of "acquire output data" and "send the acquired output data".

(Variant 1) The memory 434 of the web page server 400 may store a cookie table including a plurality of cookie files in advance. In this variant, the web page server 400 stores, in the cookie table, the model name "M1" and the serial number "ZZZ1" extracted in T32 of FIG. 3 in association with a first cookie file among the plurality of cookie files. Then, in T38, the web page server 400 sends a response including the completion page data and the first cookie file to the browser 238A. That is, the web page server 400 does not generate a cookie file when it receives the GET request, and sends to the mobile terminal 200A the first cookie file that is prepared in advance and does not include the model name "M1" or the serial number "ZZZ1". In this variant, "generate the output data" may be omitted.

(Variant 2) In T36 of FIG. 3, the web page server 400 may send a first specific file different from the cookie file C1 to the mobile terminal 200A. Further, in T76 of FIG. 5, the web page server 400 may send a second specific file different from the cookie file C2 to the mobile terminal 200A. The first and second specific files do not include the domain name "webserver.com" of the web page server 400. The first specific file includes the model name "M1" and the serial number "ZZZ1", and the second specific file includes the model name "M1", the serial number "ZZZ1", and the ID "UUU1". When the browser 238A of the mobile terminal 200A accesses any web server on the internet 4, the first and second specific files are sent to the web server from the mobile terminal 200A. In this case, the web page server 400 receives a GET request including the second specific file from the mobile terminal 200A in T312 of FIG. 9 and extracts the model name "M1", the serial number "ZZZ", and the ID "UUU1" from the second specific file, for example. The subsequent processes are similar to those of the first embodiment. In this variant as well, it is possible to cause the display unit 214 to display the support page corresponding to the model name of the printer used by the user of the mobile terminal 200A. In this variant, the specific files are examples of "specific information", and "specific information" does not include the domain information.

(Variant 3) In a case of receiving the GET request in T532 of FIG. 13 in a state where the user of the mobile terminal 200A is not logging in the data server 500, the data server 500 may generate in T534 a URL scheme including the character string 62 (that is, "model=M1&serial=ZZZ1") instead of the character string 64. In this case, the ID "UUU1" is not displayed in the user information in the print screen D14. In this variant, the URL scheme including the character string 62 is an example of "output data".

(Variant 4) In FIG. 9, the web page server 400 may send the GET response of T318 including the support page data to a device different from the mobile terminal 200A (e.g., to the mobile terminal 200B, a PC, etc.). In this variant, "terminal device" and "external device" are different devices.

(Variant 5) The mobile terminal 200A may be an example of "first terminal device" and "second terminal device". In this variant, when the print app 240A is uninstalled from the mobile terminal 200A after FIG. 9, and thereafter an operation to activate the installer 242A is performed on the terminal operation units by the user, processes similar to those of FIGS. 3 to 6 are executed between the mobile terminal 200A, the printer 100B, and the web page server 400. When the printer name "AAA2" of the printer 100B is selected in the selection screen S1 in T18 of FIG. 3, the cookie file C12 is stored in the memory 234 of the mobile terminal 200A. In this situation, when the URL 30 "http://page/webserver.com/support" corresponding to the support page is inputted by the user of the mobile terminal 200A, processes similar to those of FIG. 10 are executed between the mobile terminal 200A and the web page server 400. That is, the browser 238A causes the display unit 214 to display the support page SP2 for the model name "M2". Thus, in this variant, the web page server 400 can suitably provide the support page corresponding to the model name of the printer 100B used by the user of the mobile terminal 200A. In this variant, "first terminal device" and "second terminal device" are the same device.

(Variant 6) When the URL 12a "http://page.webserver.com/fin" is inputted instead of the URL 30 in T310 of FIG. 9, the browser 238A sends to the web page server 400 a GET request that includes the URL 12a as a destination URL and further includes the cookie file C2. In this case, the web page server 400 sends to the mobile terminal 200A a GET response that includes log information registration completion page data having the model name "M1" described therein. Then, the browser 238A causes the display unit 214 to display the log information registration completion page D1. In this variant, the log information registration completion page data is an example of "output data".

(Variant 7) In T316 of FIG. 9, the web page server 400 may generate support top page data by specifying page data corresponding to the URL 30 and describing the model name "M1" in this page data. Then, the web page server 400 sends a GET response including the support top page data and a GTM to the mobile terminal 200A. In this case, the browser 238A of the mobile terminal 200A causes the display unit 214 to display a top page D31 represented by the support top page data. As shown in FIG. 19, the top page D31 includes a list of a plurality of model names and model information indicating the model name "M1" of the printer 100A which the user is using. Due to this, the user does not have to select the model name "M1" from the list of the plurality of model names. In this variant, the support top page data is an example of "output data".

(Variant 8) The communication system 2 may not be provided with the log server 700. In this variant, when receiving the GET request including the cookie file C2 from the mobile terminal 200A in T312 of FIG. 9, the web page server 400 executes processes similar to T314 and T316 and stores in the memory 434 the history information in which the respective pieces of information extracted in T314 (that is, the URL 30, the model name "M1", and the serial number "ZZZ1") and a reception time are associated. Then, the web page server 400 sends a GET response including the support page data to the mobile terminal 200A. That is, in this variant, the web page server 400 sends the GET response not including a GTM to the mobile terminal 200A in the case of receiving the GET request from the mobile terminal 200A. In this variant, "log server" may be omitted.

(Variant 9) In T318 of FIG. 9, the web page server 400 may send a GET response including the support page data but not including the GTM to the mobile terminal 200A. In this case, the mobile terminal 200A does not execute T40 of FIG. 4. The web page server 400 may send the client ID "YYY", the URL 30, the model name "M1", and the serial number "ZZZ1" to the log server 700 before or after sending the aforementioned GET response to the mobile terminal 200A, and may cause these respective information to be stored in the memory 730 of the log server 700. In this variant, a combination of the memory 434 of the web page server 400 and the memory 730 of the log server 700 is an example of "memory".

(Variant 10) Each of the cookie files C2 and C12 simply need to include at least one of a model name, a serial number, a MAC address, an IP address, and a printer name. The serial number, the MAC address, and the IP address are examples of "identification information", and the model name and the printer name are examples of "model information". As such, in general terms, relative information simply needs to include at least one of identification information for identifying a peripheral device and model information indicating a model of the peripheral device.

(Variant 11) "Peripheral device" is not limited to the printers 100 and may be a scanner, a multi-function peripheral, or the like.

(Variant 12) In the second to fourth embodiments, in a case of receiving a GET request including a destination URL and the cookie file C2 from the mobile terminal 200, the data server 500 may send to the mobile terminal 200 a GET response including page data corresponding to the destination URL and a GTM including this destination URL.

(Variant 13) In the second embodiment, the print screen data including the model name "M1", the serial number "ZZZ1", and the ID "UUU1" may be generated by the data server 500. In this variant, the print app 240A sends to the data server 500 in T550 of FIG. 14 a GET request including the URL38, the model name "M1", the serial number "ZZZ1", and the ID "UUU1". When receiving the GET request from the mobile terminal 200A, the data server 500 specifies print screen data including the image file F1 corresponding to the character string "printpage1" in the GET request and describes the model name "M1", the serial number "ZZZ1", and the ID "UUU1" in the specified screen data. Thereby, the print screen data including the image file F1, the model name "M1", the serial number "ZZZ1", and the ID "UUU1" is generated. Then, the data server 500 sends a GET response including the generated print screen data to the mobile terminal 200A. When receiving the GET response from the data server 500, the print app 240A causes the display unit 214 to display the print screen D14 represented by the print screen data in the GET response (see FIG. 16D).

(Variant 14) In the third embodiment, the login screen data corresponding to the data server 500 may not be stored in the print app 241A. In this variant, the print app 241A generates the login screen data including the ID "UUU1" by using login screen data received from the data server 500. In this variant, in T534 of FIG. 13, the data server 500 generates a URL scheme including a URL "http://data.webserver.com/login_printpage1?model=M2&serial&ZZZ1" for requesting login screen data, instead of the URL 38. In this case, the print app 241A sends to the data server 500 after T546 a GET request including the URL "http://data.webserver.com/login_printpage1?model=M2&serial&ZZZ1" as a destination, and then receives a GET response including login screen data from the data server 500. Then, the print app 241A generates the login screen data including the ID "UUU1" by describing the ID "UUU1" in the received login screen data, and causes the display unit to display the generated login screen D21.

(Variant 15) The print apps 240A, 241A may be installed in the mobile terminal 200A. In this variant, the print app 240A is an application for supplying print data to the printer 100A, and the print app 241A is an application for supplying print data to the printer 100B.

In this variant, when processes similar to T510 to T528 of FIG. 13 are executed between the mobile terminal 200A and the data server 500, the browser 238A causes the display unit 214 to display a top page including a printer input box. When input of the model name "M1" and the serial number "ZZZ1" to the printer input box and selection of the thumbnail image IM1 are accepted, the browser 238A generates a URL "http://data.webserver.com/data1?model=M1&serial=ZZZ1" by adding a query character string "model=M1&serial=ZZZ1" to the URL 36. Then, the browser 238A sends to the data server 500 a GET request that includes the generated URL as a destination and further includes the cookie file C2. When receiving the GET request from the mobile terminal 200A, the data server 500 extracts the model name "M1" and the serial number "ZZZ1" of the printer 100A from a character string described following the character "?" in the URL in the request. In this case, the data server 500 determines that print using the print app 240A is to be executed and specifies the character string "printapp1" for activating the printer app 240A as the program name. Then, the data server 500 generates a URL scheme including the specified program name PI and sends a GET response including this URL to the mobile terminal 200A. Due to this, the user of the mobile terminal 200A can execute print using the print app 240A and the printer 100A.

On the other hand, when the input of the model name "M2" and the serial number "ZZZ2" to the printer input box and the selection of the thumbnail image IM1 are accepted, the browser 238A generates a URL "http://data.webserver.com/data1?model=M2&serial=ZZZ2" by adding a query character string "model=M2&serial=ZZZ2" to the URL 36. Then, the browser 238A sends to the data server 500 a GET request that includes the generated URL as a destination and further includes the cookie file C2. When receiving the GET request from the mobile terminal 200A, the data server 500 extracts the model name "M2" and the serial number "ZZZ2" of the printer 100B from a character string described following the character "?" in the URL in the request. In this case, the data server 500 determines that print using the print app 241A is to be executed and specifies the character string "printapp2" for activating the printer app 241A as the program name. Then, the data server 500 generates a URL scheme including the specified program name PI and sends a GET response including this URL to the mobile terminal 200A. Due to this, the user of the mobile terminal 200A can execute print using the print app 241A and the printer 100B. In this variant, the URL scheme including the character string "printapp1" and the URL scheme including the character string "printapp2" are respectively examples of "first output data" and "second output data".

(Variant 16) The data server 500 may change the URL in the URL scheme depending on whether or not the ID "UUU1" is included in the cookie file in the GET request received in T532. For example, in a case where the cookie file in the GET request received in T532 does not include the ID "UUU1", the data server 500 generates the URL scheme 82 including the URL 38. In this case, the print app 240A causes the display unit 214 to display the print screen D14. On the other hand, in a case where the cookie file in the GET request received in T532 includes the ID "UUU1", the data server 500 generates a URL scheme including a URL "http://data.webserver.com/login_printpage1data1?model=M2&serial&ZZZ1". In this case, the print app 240A causes the display unit 214 to display the login screen D21.

(Variant 17) In the respective embodiments as above, the processes of FIGS. 2 to 10, 13 to 15, 17, and 18 are executed by the CPU 432 of the web page server 400, the CPU 532 of the data server 500, a CPU (not shown) of the log server 700, the CPU 232 of the mobile terminal 200A, a CPU (not shown) of the mobile terminal 200B, and a CPU (not shown) of the material server 800 executing programs (that is, software). Instead of this, at least one of the processes of FIGS. 2 to 10, 13 to 15, 17, and 18 may be realized by hardware such as a logic circuit.

What is claimed is:

1. A server comprising:
  a processor; and
  a first memory storing computer-readable instructions therein, the computer-readable instructions, when executed by the processor, causing the server to:
  receive a specific signal including specific information from a terminal device via the Internet, the specific information being obtained by using relative information related to a peripheral device that is used by a user of the terminal device, the peripheral device being different from the terminal device, and the relative information including at least one of identification information for identifying the peripheral device and model information indicating a model of the peripheral device;
  acquire output data corresponding to the relative information by using the specific information included in the specific signal received from the terminal device; and
  send the acquired output data to an external device via the Internet,
  wherein a first specific signal including first specific information is received from a first terminal device via the Internet, the first specific information being obtained by using first relative information related to a first peripheral device that is used by a first user of the first terminal device, the first peripheral device being different from the first terminal device, and
  a second specific signal including second specific information is received from a second terminal device via the Internet, the second specific information being obtained by using second relative information related to a second peripheral device that is used by a second user of the second terminal device, the second peripheral device being different from the second terminal device,
  the second peripheral device is different from the first peripheral device,
  the second relative information is different from the first relative information,
  the second specific information is different from the first specific information,
  first output data corresponding to the first relative information is acquired by using the first specific information, in response to receiving the first specific signal including the first specific information from the first terminal device,
  second output data corresponding to the second relative information is acquired by using the second specific information, in response to receiving the second specific signal including the second specific information from the second terminal device, the second output data being different from the first output data,
  the acquired first output data is sent to a first external device in a case where the first output data is acquired, and
  the acquired second output data is sent to a second external device in a case where the second output data is acquired.

2. The server as in claim 1, wherein
the computer-readable instructions, when executed by the processor, further cause the server to:
receive a first signal including the relative information from the terminal device via the Internet;
generate the specific information by using the relative information included in the first signal; and
send the generated specific information to the terminal device via the Internet,
wherein after the specific information has been sent to the terminal device, the specific signal including the specific information is received from the terminal device.

3. The server as in claim 2, wherein
the specific information is a cookie file,
the specific signal includes a first URL and the specific information which is the cookie file, the first URL including a domain of the server, and
the first signal including the relative information includes a second URL, the second URL including the domain of the server and the relative information described as a query.

4. The server as in claim 3, wherein
the specific information includes the domain of the server, and
in a case where an instruction for designating the first URL including the domain of the serve is given to the terminal device by the user, the specific signal is received from the terminal device, the specific signal including the designated first URL and the specific information which is the cookie file including the domain included in the designated first URL.

5. The server as in claim 1, wherein
the specific signal including the specific information includes a specific URL, and
the specific URL includes a domain of the server and the specific information described as a query.

6. The server as in claim 1, wherein
the output data includes user information related to the user.

7. The server as in claim 6, wherein
the computer-readable instructions, when executed by the processor, further cause the server to:
receive a second signal including login information from the terminal device via the Internet, the login information being for the user to login to the server; and
execute authentication of the user by using the login information included in the second signal in a case where the second signal including the login information is received from the terminal device,
the output data including the user information is acquired in a case where the specific signal including the specific information is received from the terminal device and the authentication of the user succeeds.

8. The server as in claim 1, wherein
the output data is acquired by generating the output data using the specific information.

9. The server as in claim 1, wherein
the terminal device is the external device.

10. The server as in claim 1, wherein
the first terminal device is different from the second terminal device.

11. The server as in claim 1, wherein
the output data includes web page data for causing the terminal device to display a specific web page corresponding to the relative information.

12. The server as in claim 11, wherein
the output data includes at least one of:
the web page data representing the specific web page including the relative information;
the web page data representing the specific web page for providing the external device with information related to the peripheral device indicated by the relative information;
the web page data representing the specific web page for registering in a database information related to the peripheral device indicated by the relative information; and
the web page data representing the specific web page that includes plural pieces of link information to plural web pages corresponding to plural types of peripheral devices that include the peripheral device indicated by the relative information, the specific web page emphasizing, among the plural pieces of the link information, link information to a web page corresponding to the peripheral device indicated by the relative information.

13. The server as in claim 11, wherein
the web page data includes a URL scheme including the relative information, and
the URL scheme includes at least one of information for causing the terminal device to access a server different from the server and information for activating a specific application installed in the terminal device.

14. The server as in claim 11, wherein
the computer-readable instructions, when executed by the processor, further cause the server to:
execute a specific process for storing a first URL and the relative information related to the peripheral device in association with each other in a second memory such that the web page data accessed by the terminal device according to an instruction from the user using the peripheral device is able to be specified after the specific signal has been received, the first URL corresponding to the web page data accessed by the terminal device according to the instruction from the user, and the relative information corresponding to the specific information included in the specific signal.

15. A server system comprising:
the server as in claim 14; and
a log server different from the server and comprising the second memory,
wherein the computer-readable instructions, when executed by the processor, further cause the server to:
execute the specific process for storing the first URL and the relative information in association with each other in the second memory of the log server.

16. The server system as in claim 15, wherein
the computer-readable instructions, when executed by the processor, further cause the server to:
send a command including the first URL and the relative information to the terminal device in the specific process,
wherein the command is for causing the terminal device to send the first URL and the relative information to the log server so as to cause the log server to store the first URL and the relative information in association with each other in the second memory of the log server.

17. The server system as in claim 16, wherein
the command is for causing the terminal device to generate a second URL and to send the second URL to the log server, the second URL including a character string indicating the first URL and the relative information described as a query.

18. A non-transitory computer-readable recording medium storing computer-readable instructions for a server,
wherein the computer-readable instructions, when executed by a processor of the server, cause the server to:
receive a specific signal including specific information from a terminal device via the Internet, the specific information being obtained by using relative information related to a peripheral device that is used by a user of the terminal device, the peripheral device being different from the terminal device, and the relative information including at least one of identification information for identifying the peripheral device and model information indicating a model of the peripheral device;
acquire output data corresponding to the relative information by using the specific information included in the specific signal received from the terminal device; and
send the acquired output data to an external device via the Internet,
wherein a first specific signal including first specific information is received from a first terminal device via the Internet, the first specific information being obtained by using first relative information related to a first peripheral device that is used by a first user of the first terminal device, the first peripheral device being different from the first terminal device, and
a second specific signal including second specific information is received from a second terminal device via the Internet, the second specific information being obtained by using second relative information related to a second peripheral device that is used by a second user of the second terminal device, the second peripheral device being different from the second terminal device,
the second peripheral device is different from the first peripheral device,
the second relative information is different from the first relative information,
the second specific information is different from the first specific information,
first output data corresponding to the first relative information is acquired by using the first specific information, in response to receiving the first specific signal including the first specific information from the first terminal device,
second output data corresponding to the second relative information is acquired by using the second specific information, in response to receiving the second specific signal including the second specific information from the second terminal device, the second output data being different from the first output data,
the acquired first output data is sent to a first external device in a case where the first output data is acquired, and
the acquired second output data is sent to a second external device in a case where the second output data is acquired.

19. A method performed by a server, the method comprising:
receiving a specific signal including specific information from a terminal device via the Internet, the specific information being obtained by using relative information related to a peripheral device that is used by a user of the terminal device, the peripheral device being different from the terminal device, and the relative information including at least one of identification information for identifying the peripheral device and model information indicating a model of the peripheral device;

acquiring output data corresponding to the relative information by using the specific information included in the specific signal received from the terminal device; and sending the acquired output data to an external device via the Internet, wherein the receiving includes:

receiving a first specific signal including first specific information from a first terminal device via the Internet, the first specific information being obtained by using first relative information related to a first peripheral device that is used by a first user of the first terminal device, the first peripheral device being different from the first terminal device; and receiving a second specific signal including second specific information from a second terminal device via the Internet, the second specific information being obtained by using second relative information related to a second peripheral device that is used by a second user of the second terminal device, the second peripheral device being different from the second terminal device, wherein the second peripheral device is different from the first peripheral device, the second relative information is different from the first relative information, and the second specific information is different from the first specific information, wherein the acquiring includes:

acquiring first output data corresponding to the first relative information by using the first specific information, in response to receiving the first specific signal including the first specific information from the first terminal device; and acquiring second output data corresponding to the second relative information by using the second specific information, in response to receiving the second specific signal including the second specific information from the second terminal device, the second output data being different from the first output data, wherein the sending includes:

sending the acquired first output data to a first external device in a case where the first output data is acquired; and sending the acquired second output data to a second external device in a case where the second output data is acquired.

* * * * *